United States Patent
Graif et al.

(10) Patent No.: US 10,572,439 B1
(45) Date of Patent: Feb. 25, 2020

(54) I3C READ FROM LONG LATENCY DEVICES

(71) Applicant: QUALCOMM Incorporated, San Diego, CA (US)

(72) Inventors: Sharon Graif, Zichron Yakov (IL); Meital Zangvil, Haifa (IL); Lior Amarilio, Yokneam (IL)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/447,801

(22) Filed: Jun. 20, 2019

(51) Int. Cl.
*G06F 13/42* (2006.01)
*G06F 13/40* (2006.01)

(52) U.S. Cl.
CPC ...... *G06F 13/4291* (2013.01); *G06F 13/4031* (2013.01); *G06F 13/4234* (2013.01); *G06F 2213/0016* (2013.01)

(58) Field of Classification Search
None
See application file for complete search history.

*Primary Examiner* — Idriss N Alrobaye
*Assistant Examiner* — Dayton Lewis-Taylor
(74) *Attorney, Agent, or Firm* — Loza & Loza LLP

(57) ABSTRACT

Systems, methods, and apparatus are described. An apparatus provides a clock signal, transmits an address on a second line of the serial bus followed by a read/write bit configured to initiate a read transaction, and delays a pulse in the clock signal after transmitting the read/write bit. The pulse may be delayed for a first duration configured to accommodate a latency associated with a first slave device that is a participant in the read transaction. The apparatus may receive an acknowledgement from the first slave device while the pulse is being transmitted and may receive a first data byte from the first slave device after receiving the acknowledgment. The apparatus may stall the clock signal for a second duration after receiving the first data byte from the first slave device, and receive a second data byte from the first slave device after the acknowledgment.

30 Claims, 17 Drawing Sheets

I3C READ FROM LONG LATENCY DEVICES

TECHNICAL FIELD

The present disclosure relates generally to an interface between processing circuits and peripheral devices and, more particularly, to improving operations on a serial bus that supports devices with varying response latencies.

BACKGROUND

Mobile communication devices may include a variety of components including circuit boards, integrated circuit (IC) devices and/or System-on-Chip (SoC) devices. The components may include processing circuits, user interface components, storage and other peripheral components that communicate through a serial bus. The serial bus may be operated in accordance with a standardized or proprietary protocol.

In one example, a serial bus operated in accordance with an Inter-Integrated Circuit (I2C bus or I²C) is a serial single-ended computer bus that was intended for use in connecting low-speed peripherals to a processor. In some examples, a serial bus may employ a multi-master protocol in which one or more devices can serve as a master and a slave for different messages transmitted on the serial bus. Data can be serialized and transmitted over two bidirectional wires, which may carry a data signal, which may be carried on a Serial Data Line (SDA), and a clock signal, which may be carried on a Serial Clock Line (SCL).

In another example, Improved Inter-Integrated Circuit (I3C) protocols may be used to control operations on a serial bus. The I3C protocols are defined by the Mobile Industry Processor Interface Alliance (MIPI) and derive certain implementation aspects from the I2C protocol. Original implementations of the I2C protocol supported data signaling rates of up to 100 kilobits per second (100 kbps) in standard-mode operation, with more recent standards supporting speeds of 400 kbps in fast-mode operation, and 1 megabit per second (Mbps) in fast-mode plus operation.

As applications have become more complex, it has become desirable to couple devices with widely varying response times and latencies to a common serial bus. Conventional I3C protocols require slave devices that are not capable of responding to read commands within one cycle of the bus clock signal to respond to the read command with a negative acknowledgement (NACK), and necessitate that the master device issuing the read command repeat the read command thereby causing longer read times. Complexity of slave device design is increased in order to respond to the repeated read command. In many conventional implementations, the slave must be equipped with, and must manage, a small cache storage that holds the content of the register identified in the initial read command to respond to the command when repeated.

SUMMARY

Certain aspects of the disclosure relate to systems, apparatus, methods and techniques that enable a slave device coupled to a serial bus to respond to a read command without need for repetition of the command, including when the slave device is unable to respond within the time limit set by conventional I3C protocols.

In an aspect of the disclosure, a method for data communication includes providing a clock signal on a first line of a serial bus, transmitting an address on a second line of the serial bus followed by a read/write bit configured to initiate a read transaction, and delaying a pulse in the clock signal after transmitting the read/write bit. The pulse is delayed for a first duration configured to accommodate a latency associated with a first slave device that is a participant in the read transaction.

In certain aspects, the method includes maintaining configuration information for a plurality of slave devices, the configuration information identifying device latencies associated with each of the plurality of slave devices. The first duration may be configured based on a device latency of the first slave device identified in the configuration information. The method may further include populating the configuration information while enumerating one or more of the plurality of slave devices. The device latencies may relate to different types of storage device. The configuration information may include device latencies reported by one or more of the plurality of slave devices.

In various aspects, the method includes configuring the first duration after the first slave device wins a bus arbitration process, and/or prolonging a low-logic state in the clock signal after transmitting the read/write bit.

In some aspects, the method includes receiving an acknowledgement from the first slave device while the pulse is being transmitted, and receiving a first data byte from the first slave device after receiving the acknowledgment. The method may include stalling the clock signal for a second duration after receiving the first data byte from the first slave device, and receiving a second data byte from the first slave device after receiving the acknowledgment. The first duration and the second duration may have the same or different lengths.

In an aspect of the disclosure, a data communication apparatus has a processor and a bus interface configured to couple the apparatus to a serial bus that has a first line configured to carry a clock signal and a second line configured to carry a data signal. The processor may be configured to provide the clock signal, transmit an address on a second line of the serial bus followed by a read/write bit configured to initiate a read transaction, and delay a pulse in the clock signal after transmitting the read/write bit. The pulse may be delayed for a first duration configured to accommodate a latency associated with a first slave device that is a participant in the read transaction.

In an aspect of the disclosure, a processor-readable storage medium includes code which, when executed by a processor, causes the processor to provide a clock signal on a first line of a serial bus, transmit an address on a second line of the serial bus followed by a read/write bit configured to initiate a read transaction, and delay a pulse in the clock signal after transmitting the read/write bit. The pulse may be delayed for a first duration configured to accommodate a latency associated with a first slave device that is a participant in the read transaction.

DETAILED DESCRIPTION

Figure 1:
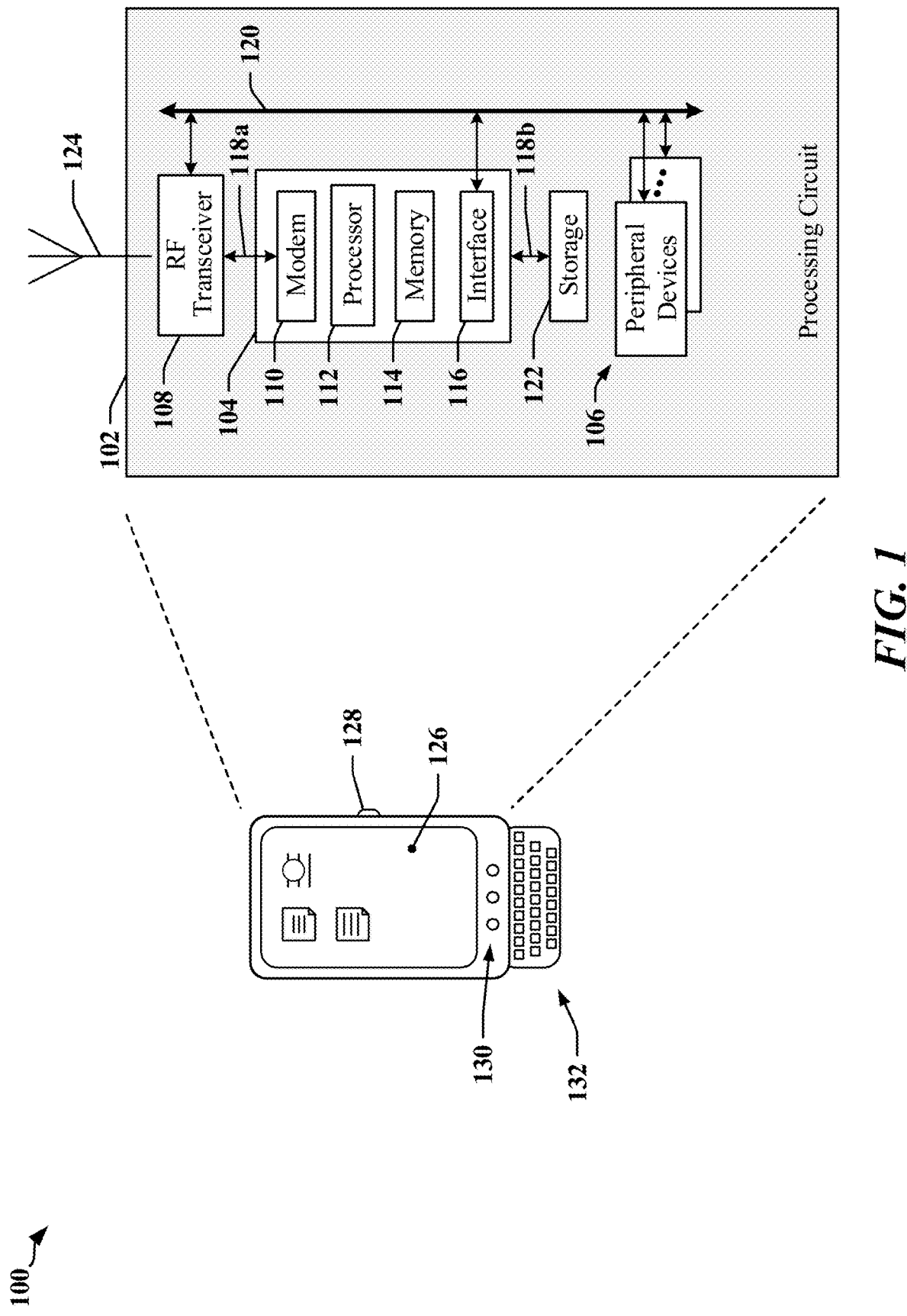
FIG. 1 illustrates an apparatus employing a data link between IC devices that is selectively operated according to one of plurality of available standards.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known structures and components are shown in block diagram form in order to avoid obscuring such concepts.

Several aspects of the invention will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

Overview

Devices that include multiple SoC and other IC devices often employ a serial bus to connect an application processor or other host device with modems and other peripherals. The serial bus may be operated in accordance with specifications and protocols defined by a standards body. In various examples illustrated in this disclosure, the serial bus may be operated in accordance with a standard or protocol that defines timing relationships between signals and transmissions, such as an I2C and/or I3C protocol. In various examples, the protocol expects a device to respond to a read command sent by a master device by providing valid data on the serial bus within a clock cycle after transmission of the read command has been completed. A slave device provides an acknowledgement when it intends, and is able to respond in a timely manner. Some slave devices may be unable to respond within the one-clock cycle limit and may provide a negative acknowledgement, causing the master device to resend the read command. Response times vary for some slave devices due to variable latencies of different types of memory devices and/or configuration of circuits within the slave device.

According to certain aspects disclosed herein, the master device may maintain a table of delay values referenced by enumerated devices coupled to the serial bus. The bus master may extend the time for response for each slave device that is otherwise unable to respond within the one-clock cycle limit.

Example of an Apparatus with a Serial Data Link

According to certain aspects, a serial data link may be used to interconnect electronic devices that are subcomponents of an apparatus such as a cellular phone, a smart phone, a session initiation protocol (SIP) phone, a laptop, a notebook, a netbook, a smartbook, a personal digital assistant (PDA), a satellite radio, a global positioning system (GPS) device, a smart home device, intelligent lighting, a multimedia device, a video device, a digital audio player (e.g., MP3 player), a camera, a game console, an entertainment device, a vehicle component, a wearable computing device (e.g., a smart watch, a health or fitness tracker, eyewear, etc.), an appliance, a sensor, a security device, a vending machine, a smart meter, a drone, a multicopter, or any other similar functioning device.

FIG. 1 illustrates an example of an apparatus 100 that may employ a data communication bus. The apparatus 100 may include an SoC a processing circuit 102 having multiple circuits or devices 104, 106 and/or 108, which may be implemented in one or more ASICs or in an SoC. In one example, the apparatus 100 may be a communication device and the processing circuit 102 may include a processing device provided in an ASIC 104, one or more peripheral devices 106, and a transceiver 108 that enables the apparatus to communicate through an antenna 124 with a radio access network, a core access network, the Internet and/or another network.

The ASIC 104 may have one or more processors 112, one or more modems 110, on-board memory 114, a bus interface circuit 116 and/or other logic circuits or functions. The processing circuit 102 may be controlled by an operating system that may provide an application programming interface (API) layer that enables the one or more processors 112 to execute software modules residing in the on-board memory 114 or other processor-readable storage 122 provided on the processing circuit 102. The software modules may include instructions and data stored in the on-board memory 114 or processor-readable storage 122. The ASIC 104 may access its on-board memory 114, the processor-readable storage 122, and/or storage external to the processing circuit 102. The on-board memory 114, the processor-readable storage 122 may include read-only memory (ROM)

or random-access memory (RAM), electrically erasable programmable ROM (EEPROM), flash cards, or any memory device that can be used in processing systems and computing platforms. The processing circuit 102 may include, implement, or have access to a local database or other parameter storage that can maintain operational parameters and other information used to configure and operate the apparatus 100 and/or the processing circuit 102. The local database may be implemented using registers, a database module, flash memory, magnetic media, EEPROM, soft or hard disk, or the like. The processing circuit 102 may also be operably coupled to external devices such as the antenna 124, a display 126, operator controls, such as switches or buttons 128, 130 and/or an integrated or external keypad 132, among other components. A user interface module may be configured to operate with the display 126, external keypad 132, etc. through a dedicated communication link or through one or more serial data interconnects.

The processing circuit 102 may provide one or more buses 118a, 118b, 120 that enable certain devices 104, 106, and/or 108 to communicate. In one example, the ASIC 104 may include a bus interface circuit 116 that includes a combination of circuits, counters, timers, control logic and other configurable circuits or modules. In one example, the bus interface circuit 116 may be configured to operate in accordance with communication specifications or protocols. The processing circuit 102 may include or control a power management function that configures and manages the operation of the apparatus 100.

Figure 2:
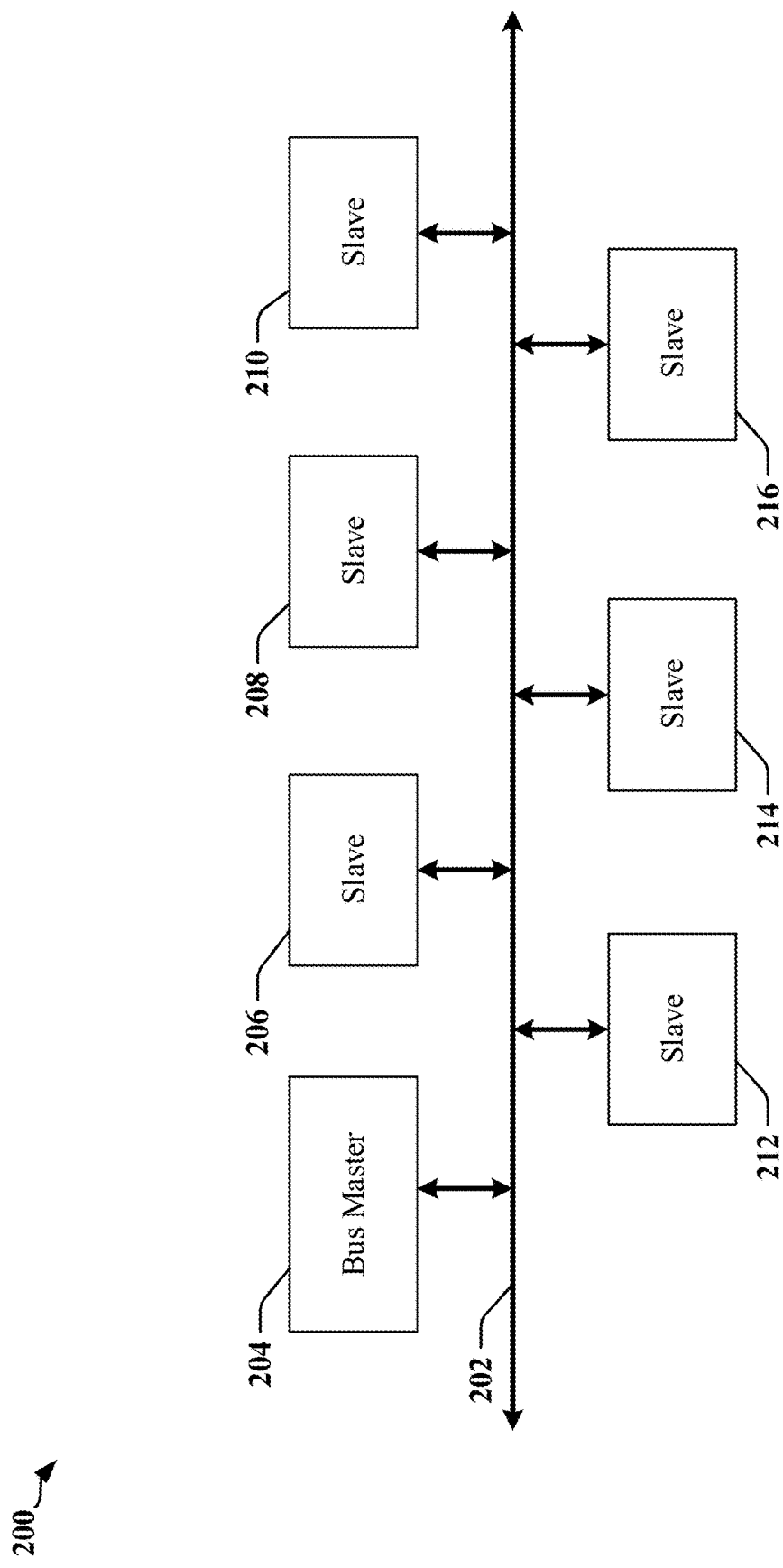
FIG. 2 illustrates a communication interface in which a plurality of devices is connected using a serial bus.

FIG. 2 illustrates a communication link 200 in which a configuration of devices 204, 206, 208, 210, 212, 214 and 216 are connected using a serial bus 202. In one example, the devices 204, 206, 208, 210, 212, 214 and 216 may be adapted or configured to communicate over the serial bus 202 in accordance with an I3C protocol. In some instances, one or more of the devices 204, 206, 208, 210, 212, 214 and 216 may alternatively or additionally communicate using other protocols, including an I2C protocol, for example.

Communication over the serial bus 202 may be controlled by a master device 204. In one mode of operation, the master device 204 may be configured to provide a clock signal that controls timing of a data signal. In another mode of operation, two or more of the devices 204, 206, 208, 210, 212, 214 and 216 may be configured to exchange data encoded in symbols, where timing information is embedded in the transmission of the symbols.

Figure 3:
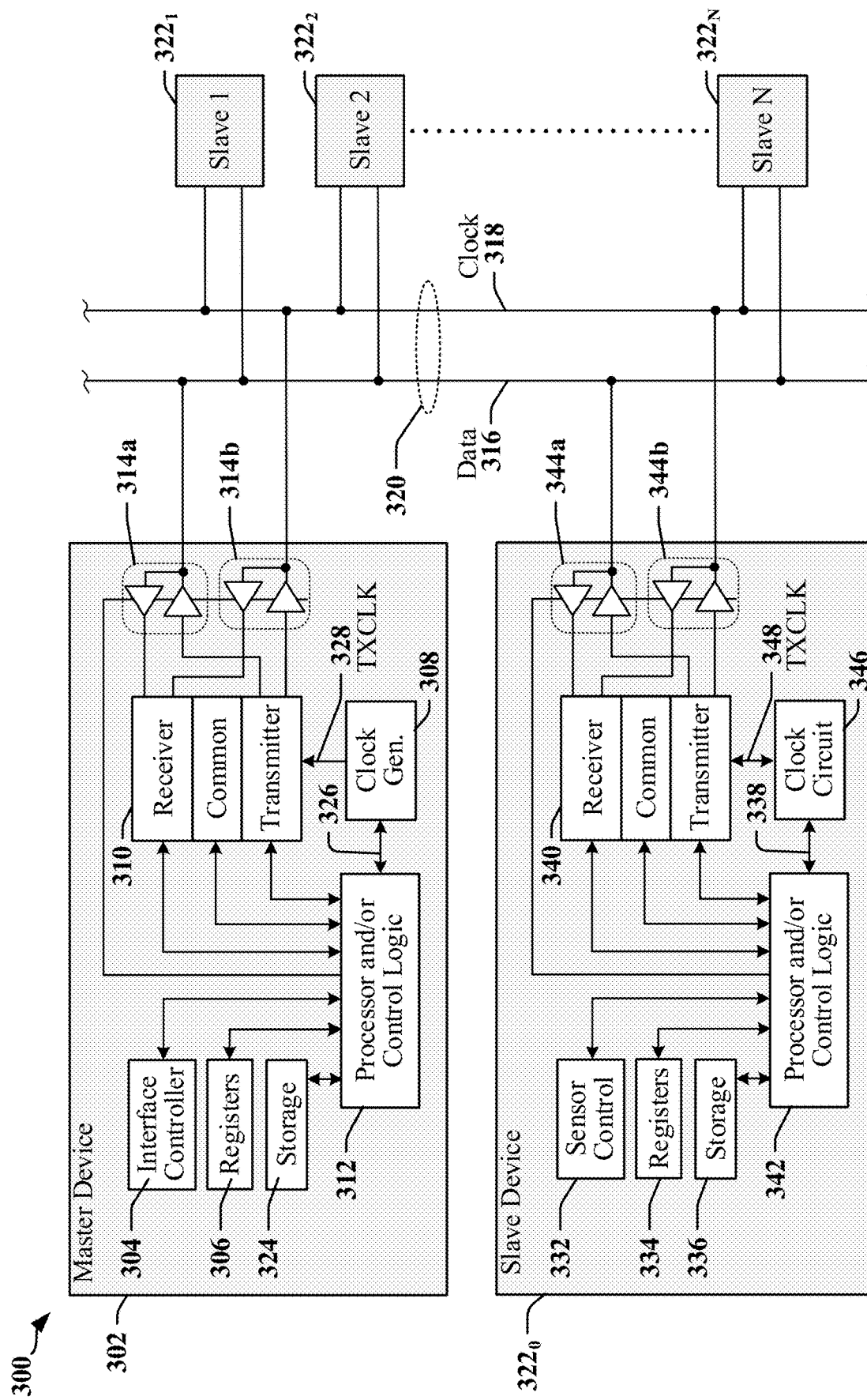
FIG. 3 illustrates certain aspects of an apparatus that includes multiple devices connected to a serial bus.

FIG. 3 illustrates certain aspects of an apparatus 300 that includes multiple devices 302, and $322_0$-$322_N$ coupled to a serial bus 320. The devices 302 and $322_0$-$322_N$ may be implemented in one or more semiconductor IC devices, such as an applications processor, SoC or ASIC. In various implementations the devices 302 and $322_0$-$322_N$ may include, support or operate as a modem, a signal processing device, a display driver, a camera, a user interface, a sensor, a sensor controller, a media player, a transceiver, and/or other such components or devices. In some examples, one or more of the slave devices $322_0$-$322_N$ may be used to control, manage or monitor a sensor device. Communications between devices 302 and $322_0$-$322_N$ over the serial bus 320 is controlled by a bus master device 302. Certain types of bus can support multiple bus master devices 302.

In one example, a bus master device 302 may include an interface controller 304 that may manage access to the serial bus, configure dynamic addresses for slave devices $322_0$-$322_N$ and/or generate a clock signal 328 to be transmitted on a clock line 318 of the serial bus 320. The bus master device 302 may include configuration registers 306 or other storage 324, and other control logic 312 configured to handle protocols and/or higher-level functions. The control logic 312 may include a processing circuit such as a state machine, sequencer, signal processor or general-purpose processor. The bus master device 302 includes a transceiver 310 and line drivers/receivers 314a and 314b. The transceiver 310 may include receiver, transmitter and common circuits, where the common circuits may include timing, logic and storage circuits and/or devices. In one example, the transmitter encodes and transmits data based on timing in the clock signal 328 provided by a clock generation circuit 308. Other timing clocks 326 may be used by the control logic 312 and other functions, circuits or modules.

At least one device $322_0$-$322_N$ may be configured to operate as a slave device on the serial bus 320 and may include circuits and modules that support a display, an image sensor, and/or circuits and modules that control and communicate with one or more sensors that measure environmental conditions. In one example, a slave device $322o$ configured to operate as a slave device may provide a control function, module or circuit 332 that includes circuits and modules to support a display, an image sensor, and/or circuits and modules that control and communicate with one or more sensors that measure environmental conditions. The slave device $322o$ may include configuration registers 334 or other storage 336, control logic 342, a transceiver 340 and line drivers/receivers 344a and 344b. The control logic 342 may include a processing circuit such as a state machine, sequencer, signal processor or general-purpose processor. The transceiver 310 may include receiver, transmitter and common circuits, where the common circuits may include timing, logic and storage circuits and/or devices. In one example, the transmitter encodes and transmits data based on timing in a clock signal 348 provided by clock generation and/or recovery circuits 346. The clock signal 348 may be derived from a signal received from the clock line 318. Other timing clocks 338 may be used by the control logic 342 and other functions, circuits or modules.

The serial bus 320 may be operated in accordance with RFFE, I2C, I3C, SPMI, or other protocols. At least one device 302, $322_0$-$322_N$ may be configured to operate as a master device and a slave device on the serial bus 320. Two or more devices 302, $322_0$-$322_N$ may be configured to operate as a master device on the serial bus 320.

In some implementations, the serial bus 320 may be operated in accordance with an I3C protocol. Devices that communicate using the I3C protocol can coexist on the same serial bus 320 with devices that communicate using I2C protocols. The I3C protocols may support different communication modes, including a single data rate (SDR) mode that is compatible with I2C protocols. High-data-rate (HDR) modes may provide a data transfer rate between 6 megabits per second (Mbps) and 16 Mbps, and some HDR modes may be provide higher data transfer rates. I2C protocols may conform to de facto I2C standards providing for data rates that may range between 100 kilobits per second (kbps) and 3.2 Mbps. I2C and I3C protocols may define electrical and timing aspects for signals transmitted on the 2-wire serial bus 320, in addition to data formats and aspects of bus control. In some aspects, the I2C and I3C protocols may define direct current (DC) characteristics affecting certain signal levels associated with the serial bus 320, and/or alternating current (AC) characteristics affecting certain timing aspects of signals transmitted on the serial bus 320. In some examples, a 2-wire serial bus 320 transmits data on a data line 316 and a clock signal on the clock line 318. In some instances, data may be encoded in the signaling state, or transitions in signaling state of the data line 316 and the clock line 318.

Data Transfers Over a Serial Bus

Examples of data transfers including control signaling, command and payload transmissions are provided by way of example. The examples illustrated relate to I2C and I3C communication for convenience. However, certain concepts disclosed herein are applicable to other bus configurations and protocols, including RFFE and SPMI configurations. Certain concepts are applicable to serial buses that are operated in accordance with various I3C protocols. In one example, these concepts may be implemented when the serial bus is operated in accordance with an I3C HDR protocol that encodes data in ternary symbols (HDR-TSP), where timeslots may be defined in HDR-TSP words or in sets of six successive recovered clock pulses, which is the equivalent number of clock pulses for an HDR-TSP word. In another example, these concepts may be implemented when the serial bus is operated in accordance with an I3C HDR double data rate (HDR-DDR) protocol, where timeslots may be defined in HDR-DDR words or in the number of clock pulses. In another example, these concepts may be implemented when the serial bus is operated in accordance with a protocol that supports multiple data lanes.

Figure 4:
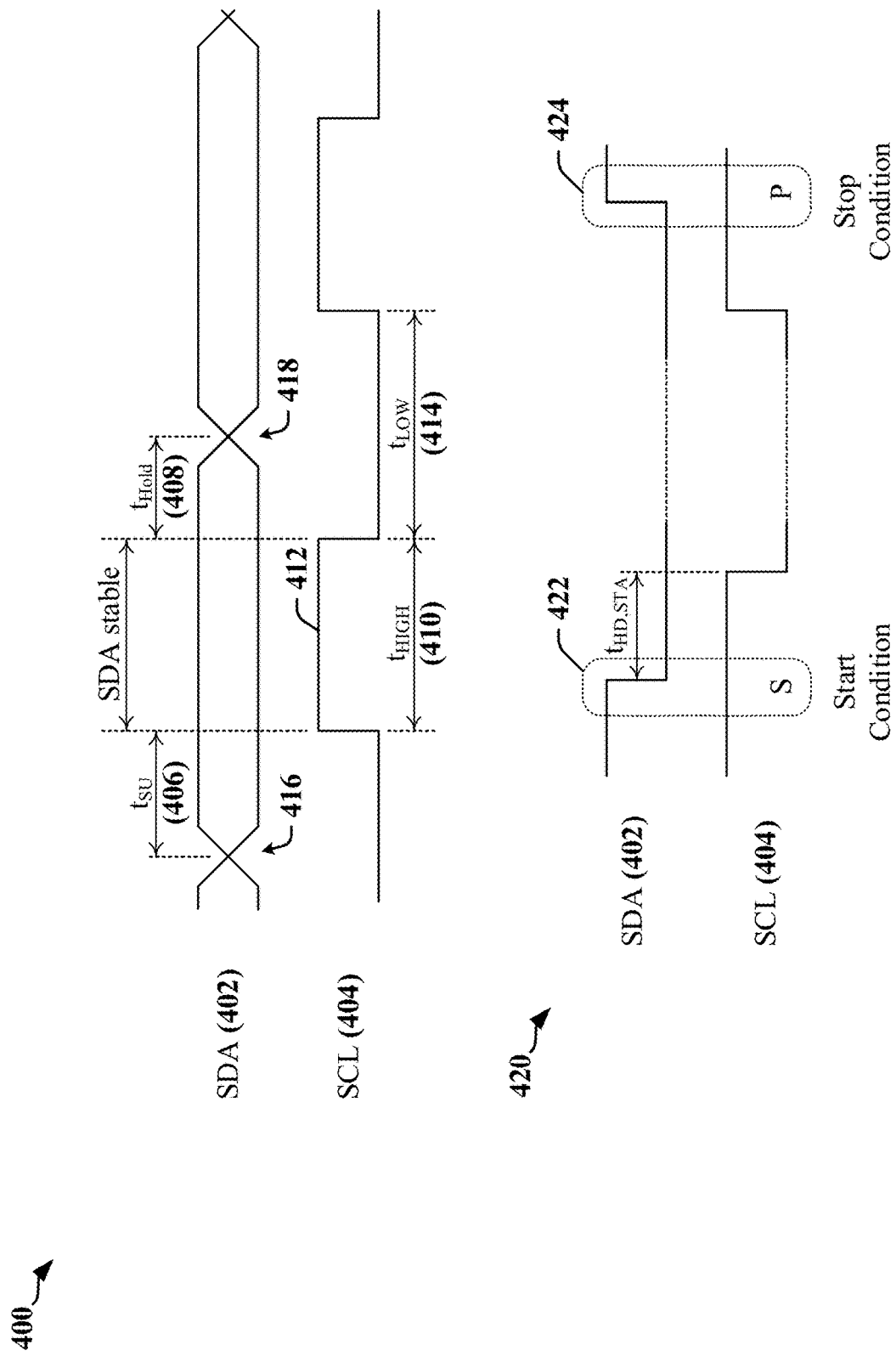
FIG. 4 illustrates certain aspects of the timing relationship between SDA and SCL wires on a conventional I2C bus.

FIG. 4 includes timing diagrams 400 and 420 that illustrate the relationship between the SDA wire 402 and the SCL wire 404 on when the serial bus is operated in an I2C or I3C mode. The first timing diagram 400 illustrates the timing relationship between the SDA wire 402 and the SCL wire 404 while data is being transferred on the conventionally configured I2C bus. The SCL wire 404 provides a series of pulses that can be used to sample data in the SDA wire 402. The pulses (including the pulse 412, for example) may be defined as the time during which the SCL wire 404 is determined to be in a high logic state at a receiver. When the SCL wire 404 is in the high logic state during data transmission, data on the SDA wire 402 is required to be stable and valid; the state of the SDA wire 402 is not permitted to change when the SCL wire 404 is in the high logic state.

In one example, specifications for conventional I2C protocol implementations (which may be referred to as "I2C Specifications") define a minimum duration 410 ($t_{HIGH}$) of the high period of the pulse 412 on the SCL wire 404. The I2C Specifications also define minimum durations for a setup time 406 ($t_{SU}$) before occurrence of the pulse 412, and a hold time 408 ($t_{Hold}$) after the pulse 412 terminates. The signaling state of the SDA wire 402 is expected to be stable during the setup time 406 and the hold time 408. The setup time 406 defines a maximum time period after a transition 416 between signaling states on the SDA wire 402 until the arrival of the rising edge of the pulse 412 on the SCL wire 404. The hold time 408 defines a minimum time period after the falling edge of the pulse 412 on the SCL wire 404 until a next transition 418 between signaling states on the SDA wire 402. The I2C Specifications also define a minimum duration 414 for a low period ($t_{LOW}$) for the SCL wire 404. The data on the SDA wire 402 is typically stable and/or can be captured for the duration 410 ($t_{HIGH}$) when the SCL wire 404 is in the high logic state after the leading edge of the pulse 412.

The second timing diagram 420 of FIG. 4 illustrates signaling states on the SDA wire 402 and the SCL wire 404 between data transmissions on a serial bus. Certain protocols provide for transmission of 8-bit data (bytes) and 7-bit addresses. A receiver may acknowledge transmissions by driving the SDA wire 402 to the low logic state for one clock period. The low signaling state represents an acknowledgement (ACK) indicating successful reception and a high signaling state represents a negative acknowledgement (NACK) indicating a failure to receive or an error in reception.

A start condition 422 is defined to permit the current bus master to signal that data is to be transmitted. The start condition 422 occurs when the SDA wire 402 transitions from high to low while the SCL wire 404 is high. The bus master initially transmits the start condition 422, which may be also be referred to as a start bit, followed by a 7-bit address of an I2C slave device with which it wishes to exchange data. The address is followed by a single bit that indicates whether a read or write operation is to occur. The addressed slave device, if available, responds with an ACK bit. If no slave device responds, the bus master may interpret the high logic state of the SDA wire 402 as a NACK. The master and slave devices may then exchange bytes of information in frames, in which the bytes are serialized such that the most significant bit (MSB) is transmitted first. The transmission of the byte is completed when a stop condition 424 is transmitted by the master device. The stop condition 424 occurs when the SDA wire 402 transitions from low to high while the SCL wire 404 is high.

Figure 5:
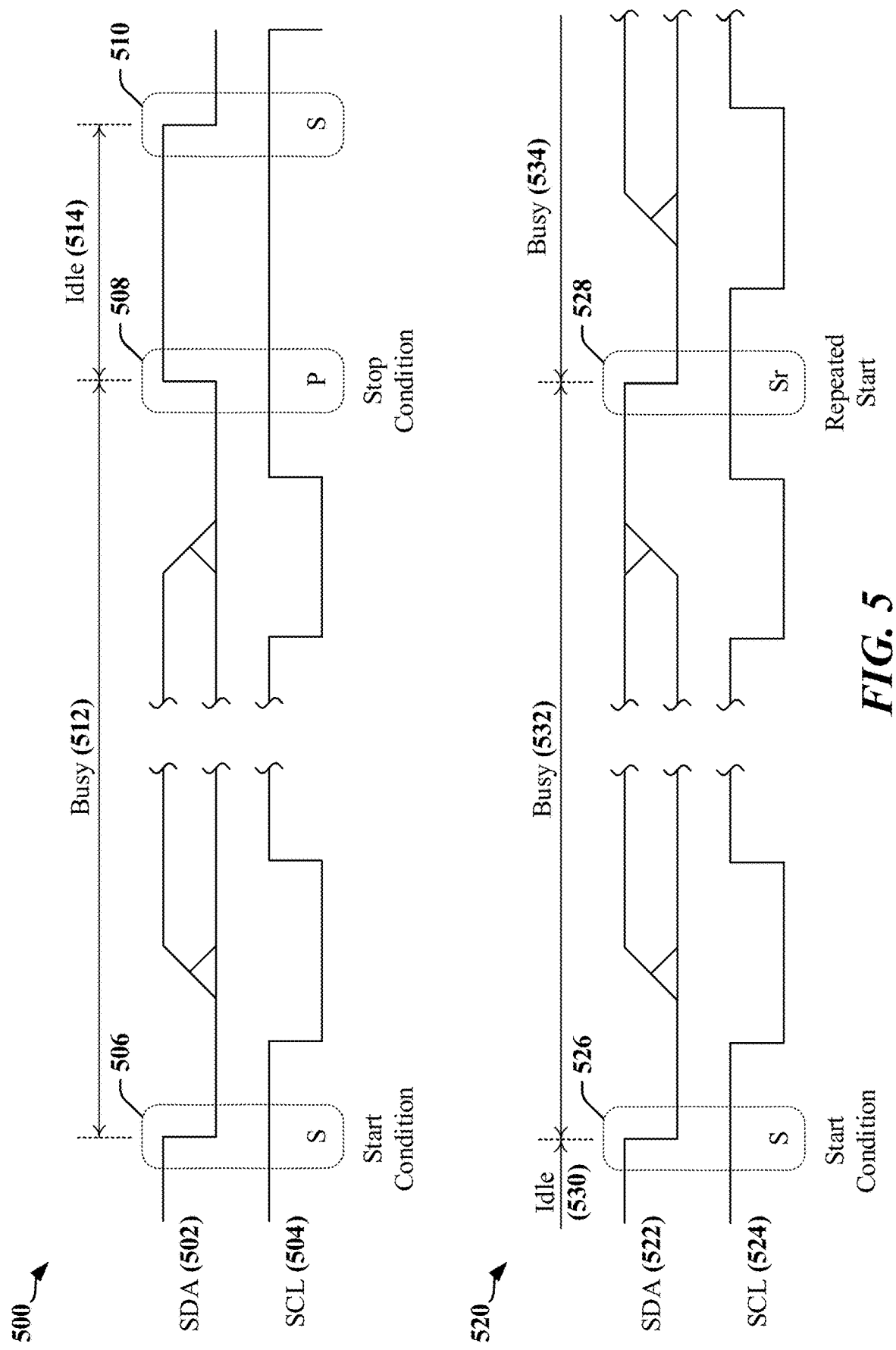
FIG. 5 is a timing diagram that illustrates timing associated with multiple frames transmitted on an I2C bus.

FIG. 5 includes diagrams 500 and 520 that illustrate timing associated with data transmissions on a serial bus operated in accordance with an I2C or I3C protocol. As illustrated in the first diagram 500, an idle period 514 may occur between a stop condition 508 and a consecutive start condition 510. In the illustrated example, the SDA line 502 and SCL line 504 may be held and/or driven to a high voltage state during the idle period 514. This idle period 514 may be prolonged, and may result in reduced data throughput when the serial bus remains idle between the stop condition 508 and the consecutive start condition 510. In operation, a busy period 512 commences when the I2C bus master transmits a first start condition 506, followed by data. The busy period 512 ends when the bus master transmits a stop condition 508 and the idle period 514 ensues. The idle period 514 ends when a second start condition 510 is transmitted.

The second timing diagram 520 illustrates a method by which the number of occurrences of an idle period 514 may be reduced. In the illustrated example, data is available for transmission before a first busy period 532 ends. The bus master device may transmit a repeated start condition 528 (Sr) rather than a stop condition. The repeated start condition 528 terminates the preceding data transmission and simultaneously indicates the commencement of a next data transmission. The state transition on the SDA wire 522 corresponding to the repeated start condition 528 is identical to the state transition on the SDA wire 522 for a start condition 526 that occurs after an idle period 530. For both the start condition 526 and the repeated start condition 528, the SDA wire 522 transitions from high to low while the SCL wire 524 is high. When a repeated start condition 528 is used between data transmissions, a first busy period 532 is immediately followed by a second busy period 534.

Figure 6:
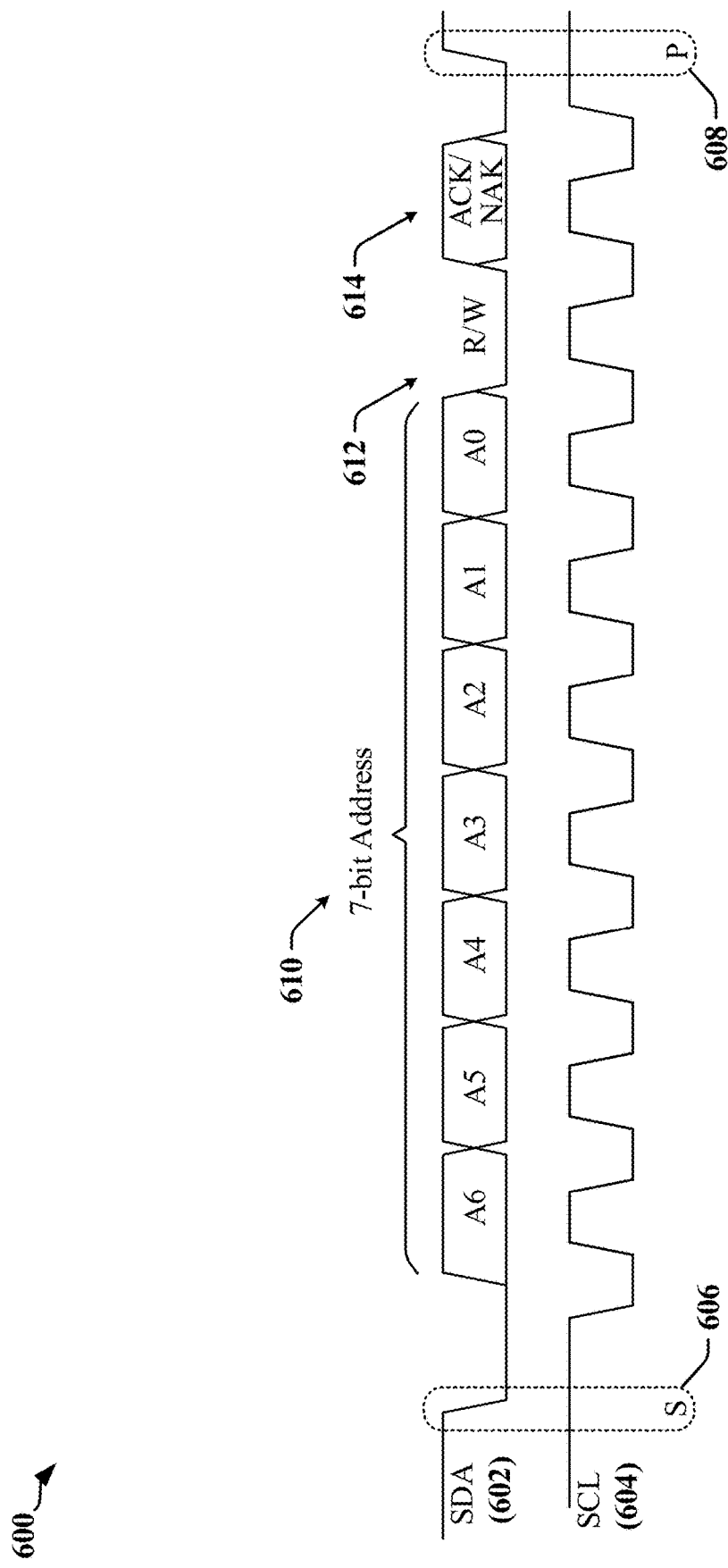
FIG. 6 illustrates timing related to a command word sent to a slave device in accordance with I2C protocols.

FIG. 6 is a diagram 600 that illustrates an example of the timing associated with an address word sent to a slave device in accordance with certain I2C and/or I3C protocols. The address word is transmitted using drivers that are operated in an open-drain mode. In the example, a master device initiates the transaction with a start condition 606, whereby the SDA wire 602 is driven from high to low while the SCL wire 604 remains high. The master device then transmits a clock signal on the SCL wire 604. The seven-bit address 610 of a slave device is then transmitted on the SDA wire 602. The seven-bit address 610 is followed by a Write/Read command bit 612, which indicates "Write" when low and "Read" when high. The slave device may respond in the next clock interval 614 with an acknowledgment (ACK) by driving the SDA wire 602 low. If the slave device does not respond, the SDA wire 602 is pulled high and the master device treats the lack of response as a NACK. The master device may terminate the transaction with a stop condition 608 by driving the SDA wire 602 from low to high while the SCL wire 604 is high. This transaction can be used to determine whether a slave device with the transmitted address coupled to the serial bus is in an active state.

Figure 7:
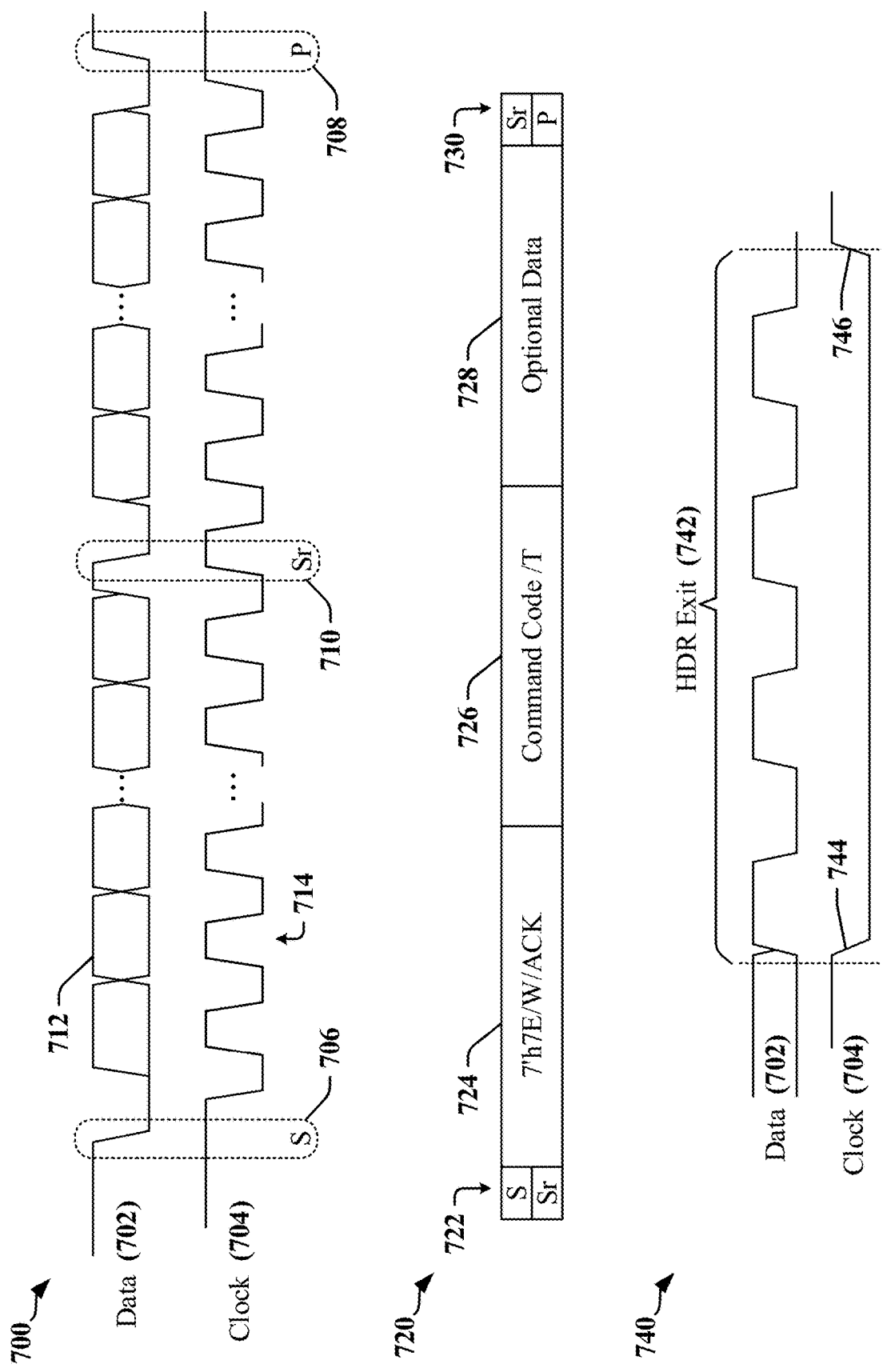
FIG. 7 includes a timing diagram that illustrates an example of signaling on a serial bus when the serial bus is operated in a mode of operation defined by I3C specifications.

FIG. 7 includes a timing diagram 700 that illustrates signaling on a serial bus when the serial bus is operated in an SDR mode of operation defined by I3C specifications. Data transmitted on a first wire of the serial bus, which may be referred to as the Data wire 702, SDA or SDATA, may be captured using a clock signal transmitted on a second wire of the serial bus, which may be referred to as the Clock wire 704, SCL or SCLOCK. During data transmission, the signaling state 712 of the Data wire 702 is expected to remain constant for the duration of the pulses 714 when the Clock wire 704 is at a high voltage level. Transitions on the Data wire 702 when the Clock wire 704 is at the high voltage level indicate a START condition 706, a STOP condition 708 or a Repeated Start 710.

I3C protocols define a START condition 706 that permits the current bus master to signal that data is to be transmitted. The START condition 706 occurs when the Data wire 702 transitions from high to low while the Clock wire 704 is high. The bus master may signal completion and/or termination of a transmission using a STOP condition 708. The STOP condition 708 is indicated when the Data wire 702 transitions from low to high while the Clock wire 704 is high. A Repeated Start 710 may be transmitted by a bus master that wishes to initiate a second transmission upon completion of a first transmission. The Repeated Start 710 is transmitted instead of a STOP condition 708, and has the significance of a STOP condition 708 followed immediately by a START condition 706. The Repeated Start 710 occurs when the Data wire 702 transitions from high to low while the Clock wire 704 is high.

The bus master may transmit an initiator 722 that may be a START condition 706 or a Repeated Start 710 prior to transmitting an address of a slave, a command, and/or data. FIG. 7 illustrates a command code transmission 720 by the bus master. The initiator 722 may be followed in transmission by an address header 724 and a command code 726. The command code 726 may, for example, cause the serial bus to transition to a desired mode of operation. In some instances, data 728 may be transmitted. The command code transmission 720 may be followed by a terminator 730 that may be a STOP condition 708 or a Repeated Start 710.

Certain serial bus interfaces support signaling schemes that provide higher data rates. In one example, I3C specifications define multiple high data rate (HDR) modes, including a high data rate, double data rate (HDR-DDR) mode in which data is transferred at both the rising edge and the falling edge of the clock signal.

An I3C bus may be switched between SDR and DDR modes. FIG. 7 includes an example of signaling 740 transmitted on the Data wire 702 and the Clock wire 704 to initiate certain mode changes. The signaling 740 is defined by I3C protocols for use in initiating restart, exit and/or break from I3C HDR modes of communication. The signaling 740 includes an HDR Exit 742 that may be used to cause an HDR break or exit. The HDR Exit 742 commences with a falling edge 744 on the Clock wire 704 and ends with a rising edge 746 on the Clock wire 704. While the Clock wire 704 is in a low signaling state, four pulses are transmitted on the Data wire 702. I2C devices ignore the Data wire 702 when no pulses are provided on the Clock wire 704.

Figure 8:
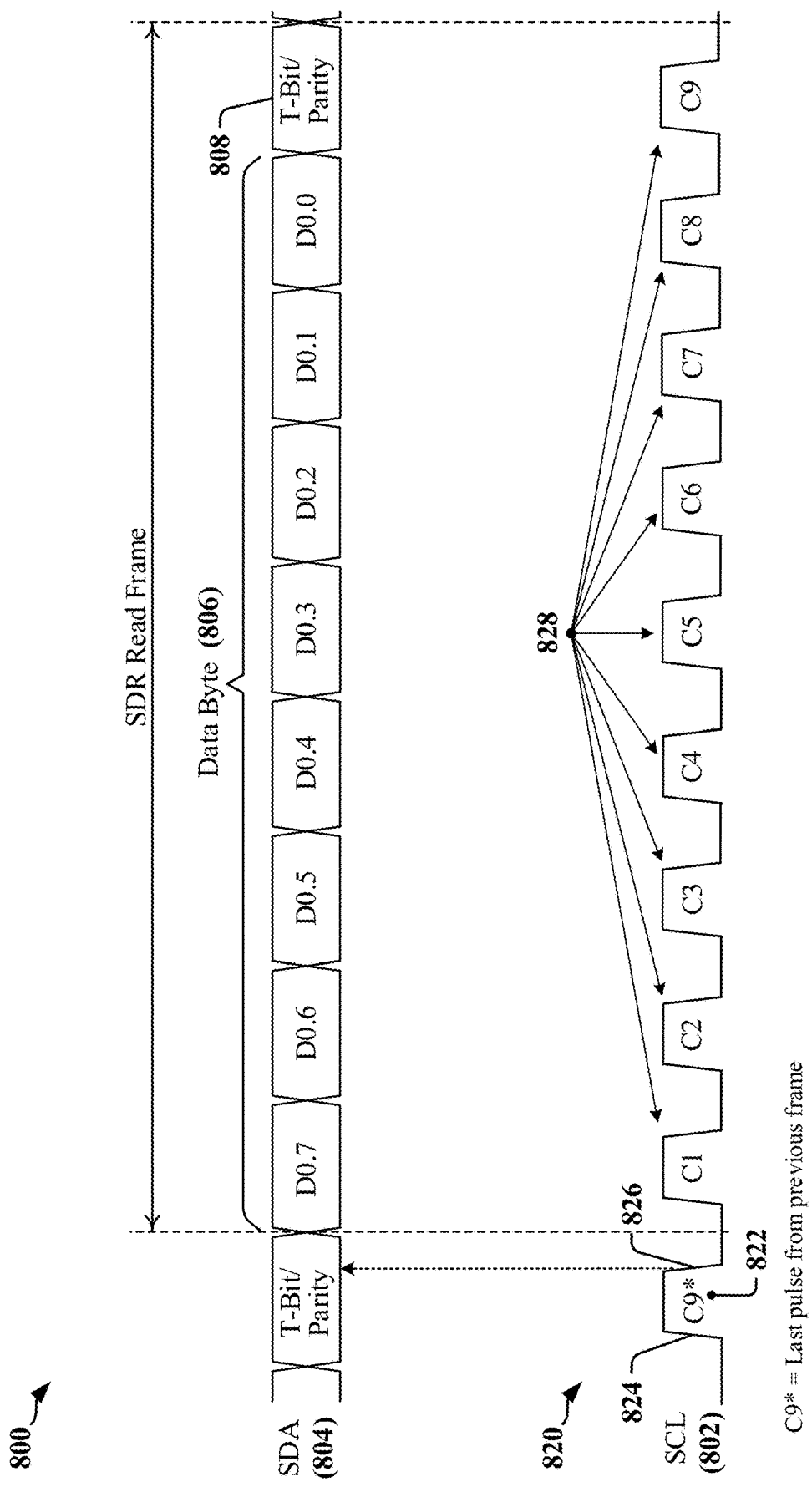
FIG. 8 is a timing diagram that illustrates an example of a transmission of a frame in an I3C single data rate mode.
Figure 9:
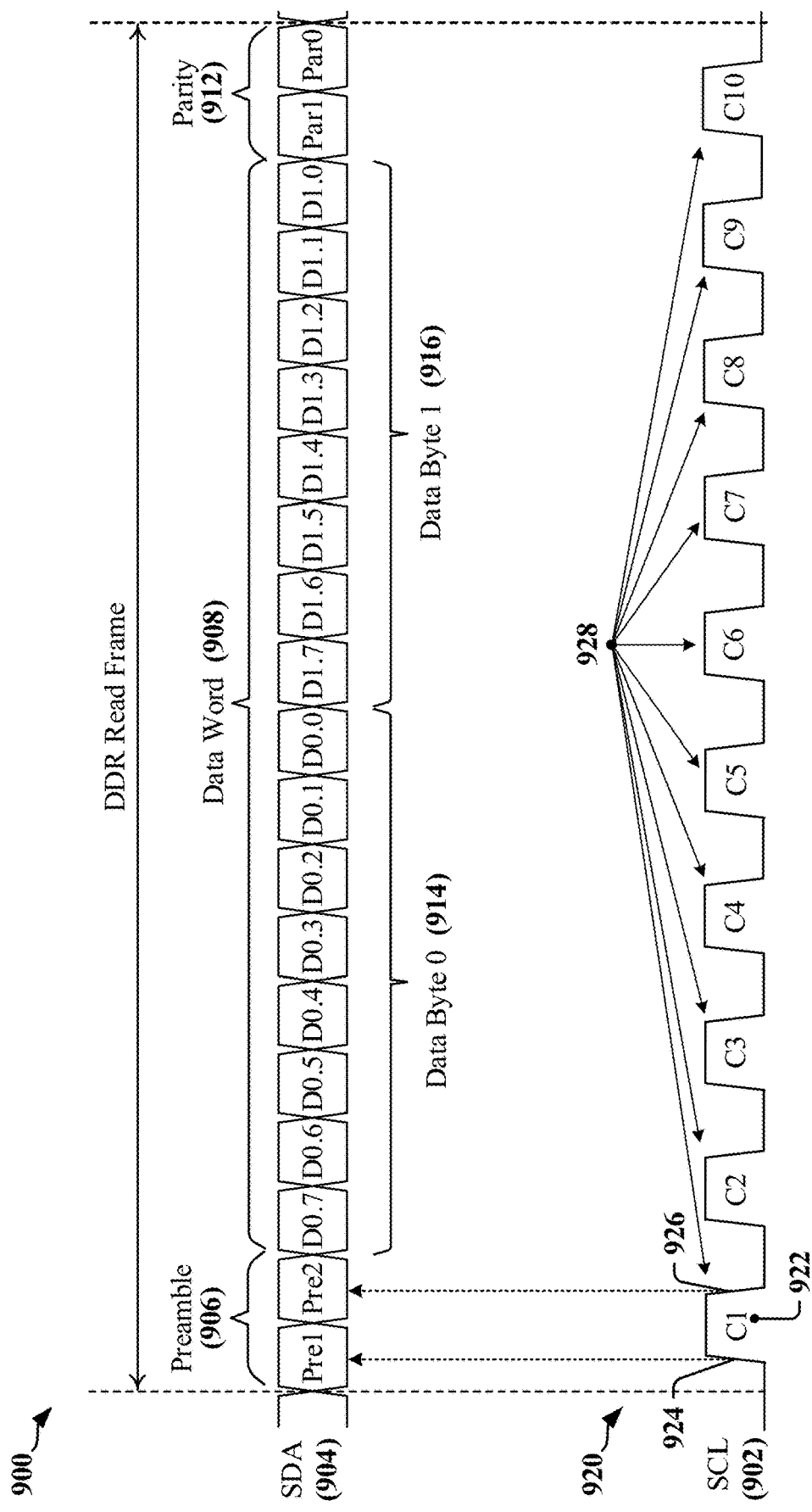
FIG. 9 is a timing diagram that illustrates an example of a transmission of a frame in an I3C high data rate mode, where data is transmitted at double data rate (DDR).

FIGS. 8 and 9 include timing diagrams that illustrate frames 800, 900 transmitted on a serial bus when a bus master device is reading from a slave device. The serial bus has a clock wire (SCL 802, 902) and a Data wire (SDA 804, 904). A clock signal 820, 920 transmitted on SCL 802, 902 provides timing may be usable when the serial bus is operated in an I3C SDR mode and in an I3C HDR-DDR mode. The clock signal includes pulses 822, 828, 922, 928 that are defined by a rising edge 824, 924 and a falling edge 826, 926. A bus master device transmits the clock signal on the SCL 802, 902 regardless of the direction of flow of data over the serial bus.

FIG. 8 illustrates a frame 800 transmitted while the serial bus is operated in the I3C SDR mode. A single byte of data 806 is transmitted in each frame 800. The data signal transmitted on SDA 804 is expected to be stable for the duration of the high state of the pulses 828 in the clock signal 820 and, in one example, the state of SDA 804 is sampled on the falling edges of the clock pulses 828. Each byte of data 806 is followed by a bit 808 that can serve as a parity bit or a transition bit (T-Bit).

FIG. 9 illustrates a frame 900 transmitted while the serial bus is operated in the HDR-DDR mode. In the HDR-DDR mode, data is transferred at both the rising edge 924 and the falling edge 926 of a pulse 922 in the clock signal 920. A receiver samples or captures one bit of data on SDA 904 at each edge of the pulses 928 in the clock signal 920. A 2-byte data word 908 is transmitted in each frame 900 in the HDR-DDR mode. A data word 908 generally includes 16 payload bits, organized as two 8-bit bytes 914, 916 and the data word 908 is preceded by a two-bit preamble 906 and followed by two parity bits 912. The 20 bits in the frame 900 can be transferred on the edges of 10 clock pulses. The integrity of the transmission may be protected by the transmission of the parity bits 912.

In-band interrupts may be used to gain access to an I3C serial bus through an enumeration process in which a master device can identify slave devices coupled to the I3C serial bus. The enumeration process may be used during system initialization to assign dynamic addresses to slave devices. The master device may use system initialization to permit the master device to determine capabilities of the slave devices and/or to configure one or more of the slave devices. In-band interrupts may also be used by slave devices to transmit high-priority and/or low-latency messages.

Figure 10:
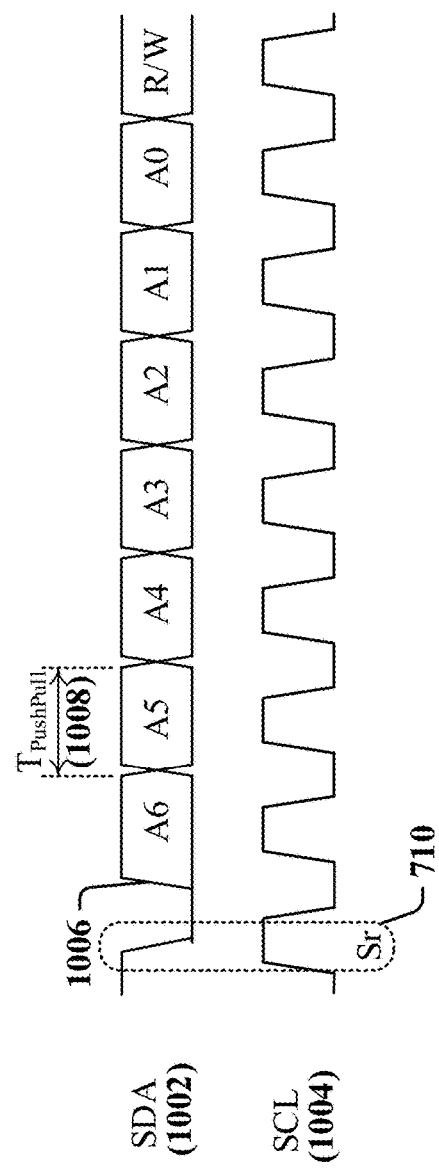
FIG. 10 illustrates address headers transmitted in accordance with I3C protocols.
Figure 10:
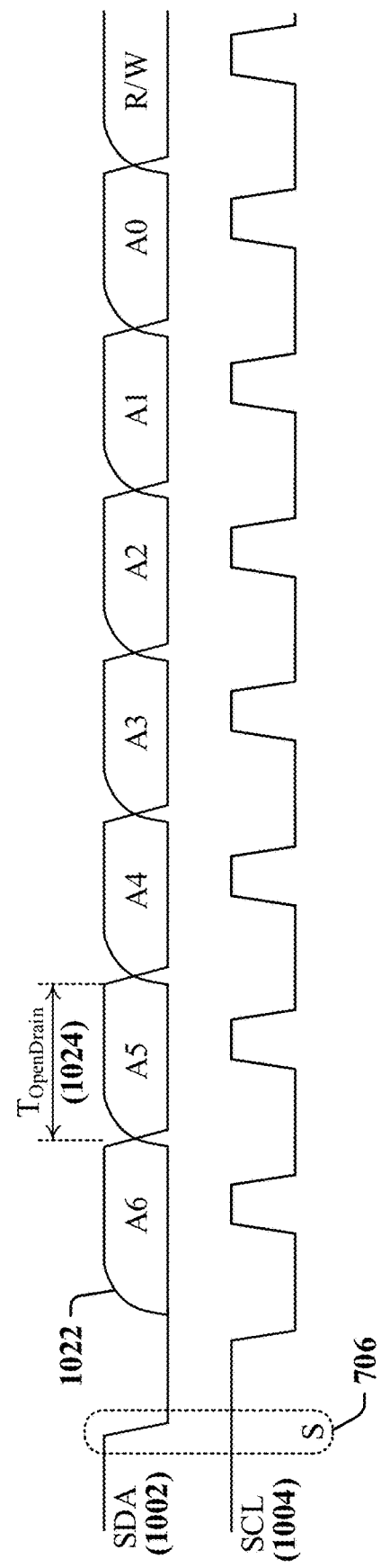

A device other than the current bus master may assert an in-band interrupt during transmission of certain address fields to initiate an arbitration process that enables the asserting device to gain access to a serial bus. The serial bus may be operated in a mode in which data is transmitted on a data line in accordance with timing provided by a clock signal transmitted on a clock line. FIG. 10 illustrates a non-arbitrable address header 1000 and an arbitrable address header 1020 that may be transmitted on the SDA line 1002 of the serial bus in accordance with I3C protocols. I3C protocols provide for different types of request to be transmitted using an I3C arbitrable address header. I3C arbitrable address headers 1020 can be transmitted after a START condition 706. An address header 724 transmitted after a Repeated Start 710 is not arbitrable. A device may use an I3C arbitrable address header to assert an In-Band Interrupt, make a secondary master request, or indicate a hot-join request.

A non-arbitrable address header 1000 is transmitted using push-pull drivers, while open-drain drivers are enabled during transmission of an arbitrable address header 1020. Rising edges 1006 in a push-pull transmission provide a shorter bit interval 1008 than the bit interval 1024 available during an open-drain transmission, due to the slow rise time of the pulled-up edges 1022 in a non-arbitrable address header 1000. In FIG. 10, the bit intervals 1008, 1024 are not depicted on a common scale.

A clock signal transmitted on the SCL line 1004 provides timing information that is used by a slave device to control transmission of bits on the SDA line 1002, where the clock signal may be used by a receiving device for sampling and/or capturing bits of data transmitted on the SDA line 1002. A bus master device may read one or more registers on a slave device or secondary master device that wins arbitration. In conventional systems, the bus master device may provide clock pulses in a clock signal that have a period sufficient to successfully read the slowest possible device coupled to the serial bus. Each slave device has different operating characteristics and limitations that affect the response time of the slave device. In one example, the response time of a slave device may be affected by the physical distance between the slave device and the bus master device. In another example, the response time of a slave device may be affected by the processing capabilities of the slave device, where a slower controller, state machine or other processor in the slave device may delay responses transmitted by the slave device during in-band interrupt handling and/or processing.

Variable Latency Devices Coupled to a Serial Bus

Multiple devices may be concurrently coupled to a multi-drop serial bus operated in accordance with I3C protocols. The I3C protocols specify certain timing requirements that must be met by the devices coupled to the serial bus. Some slave devices coupled to the serial bus have limited capabilities, a low-frequency internal clock, slow storage devices and/or complex circuits that may prevent the slave devices from meeting certain timing requirements. Such slave devices may be referred to as high-latency slave devices and their slow response time may be accommodated by certain features of the I3C protocols. In one example, a low-cost sensor device may have limited processing capabilities and may not be capable of meeting certain read timing specifications defined by an I3C SDR protocol or I3C HDR-DDR protocol. I3C protocols expect a slave device to respond to a read command by transmitting valid data within one clock cycle of completion of the read request.

Figure 11:
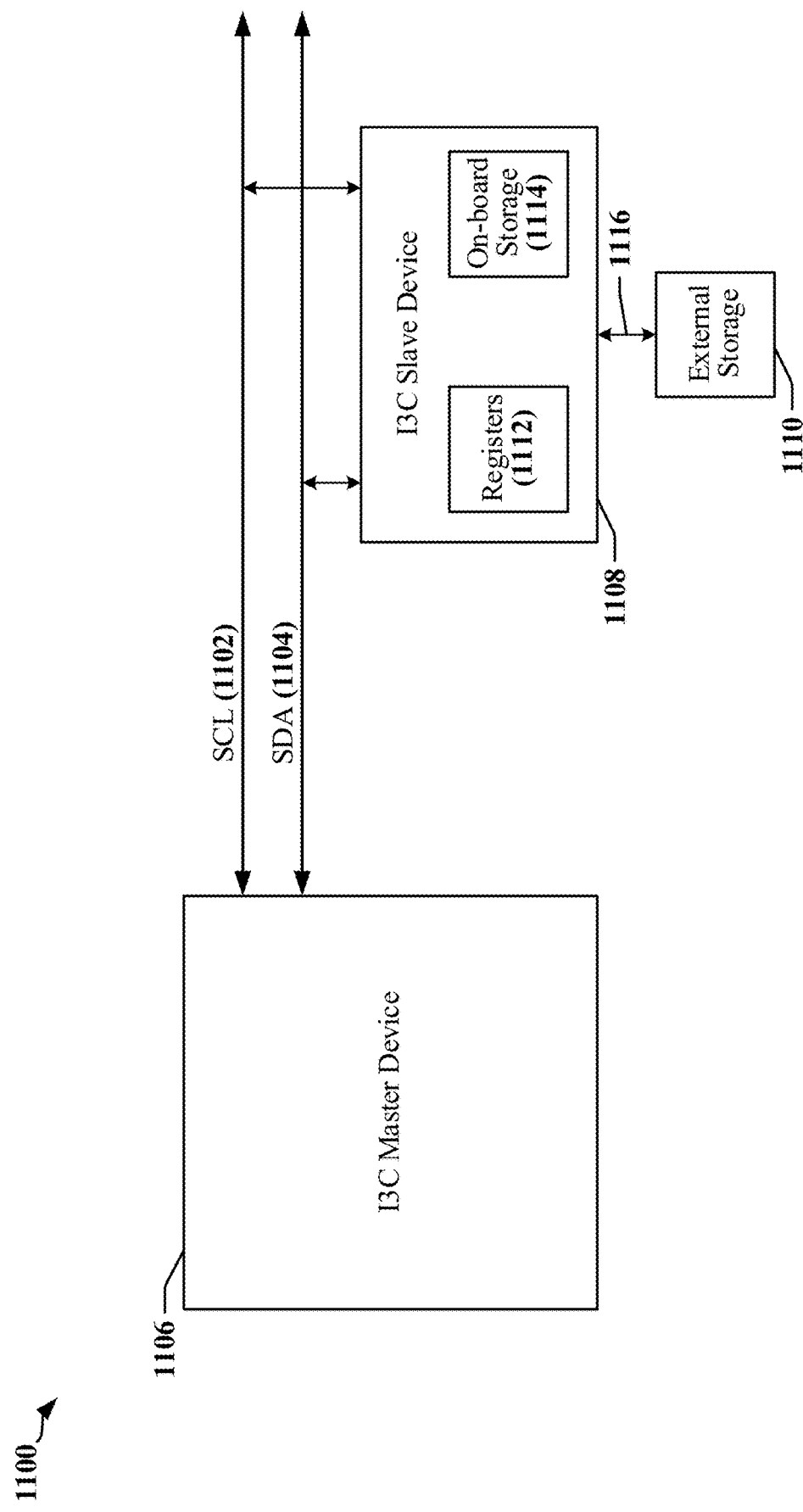
FIG. 11 illustrates a configuration of devices that may engage in slave read transactions conducted in accordance with certain aspects disclosed herein.

FIG. 11 illustrates a logical configuration 1100 of devices that may engage in a slave read transaction. A master device 1106 is coupled to a slave device 1108 using a clock line (SCL 1102) and a data line (SDA 1104). The slave device 1108 may be provisioned with a set of registers 1112 and/or other internal storage 1114 or readable components such as counters, latches, sensor registers, dynamic random-access memory (DRAM), static random-access memory (SRAM), flash memory, or the like. In some instances, external storage 1110 coupled to the slave device 1108 includes, sensor registers, DRAM, (SRAM, and/or flash memory that has a response that is slow enough to prevent compliance with initial response times defined by protocol. Increased latency may also result from the use of a bus 1116 and/or bridging device (not shown) to access the external storage 1110 or, in some instances, internal storage 1114. Different storage types can have different access times, and some types of storage may provide immediate access to stored data, while access to data in other types of storage may take a significantly longer time to complete. Immediate access may be available, for example, when the time required to access stored data enables the slave device 1108 to respond to a read command with valid data within one clock cycle of completion of the read request. The time required to access stored data from a type of storage may be referred to the latency of the type of storage. In some instances, the latency of the type of storage may be defined as the time required to commence transmission of data retrieved from the type of storage. In one example, the set of registers 1112 may be associated with low-latency access, while DRAM may be associated with a high-latency access.

Figure 12:
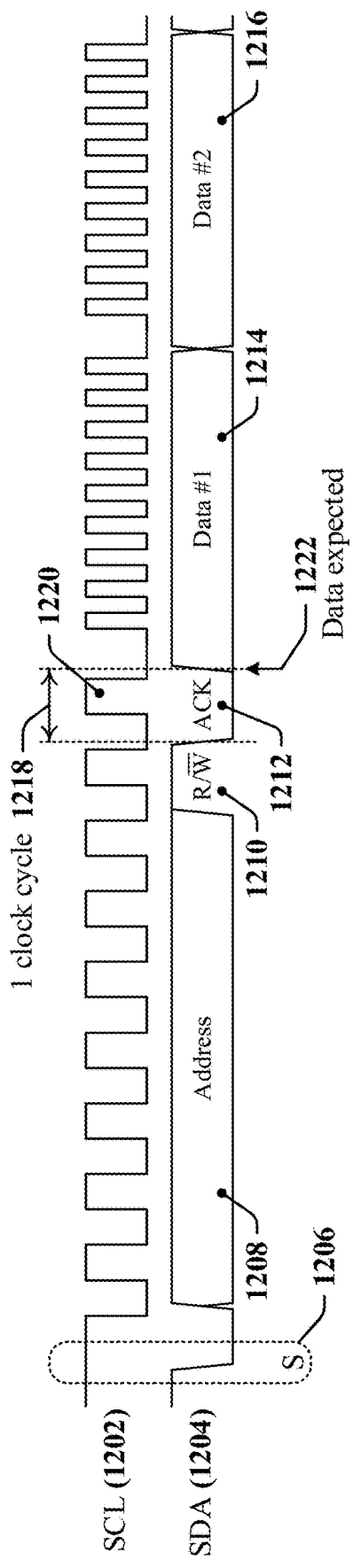
FIG. 12 illustrates the timing of read transactions on a multi-drop serial bus that is operated in accordance with an I3C protocol.
Figure 12:
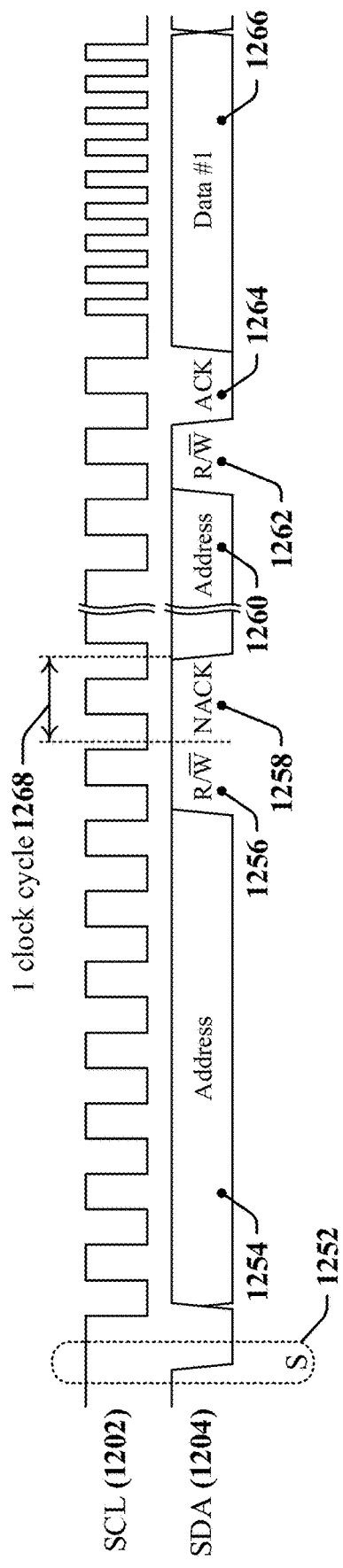

FIG. 12 includes timing diagrams 1200, 1250 that illustrate the timing of read transactions on a multi-drop serial bus that is operated in accordance with an I3C protocol. A first timing diagram 1200 illustrates timing associated with a read transaction conducted between a master device and a low-latency slave device. The read transaction commences after signaling corresponding to a start condition 1206 is transmitted on SCL 1202 and SDA 1204. The master device transmits an address 1208 in a mode consistent with I2C open-drain operation, where the clock signal transmitted on SCL 1202 has a frequency that meets I2C limits and tolerances. The address 1208 is followed by a read/write bit 1210 transmitted by setting SDA 1204 to logic high indicating a read is commanded from the location identified by the address 1208. The low-latency slave device can provide the data within one clock cycle 1218 and responds with an acknowledgement (ACK 1212) by driving SDA 1204 low in accordance with the timing of a corresponding pulse 1220 transmitted on SCL 1202. Data is expected on SDA 1204 at a point in time 1222 after the falling edge of the pulse 1220 corresponding to the ACK 1212 provided by the slave device. The low-latency slave device then transmits one or more data bytes 1214, 1216 on SDA 1204 in a mode consistent with I3C push-pull operation and commencing at the location identified by the address 1208. The clock signal transmitted on SCL 1202 may have an increased frequency according to I3C protocols.

A second timing diagram 1250 illustrates timing associated with a read transaction conducted between a master device and a high-latency slave device. The read transaction commences after signaling corresponding to a start condition 1252 is transmitted on SCL 1202 and SDA 1204. The master device transmits an address 1254 in a mode consistent with I2C open-drain operation, where the clock signal transmitted on SCL 1202 has a frequency that meets I2C limits and tolerances. The address 1254 is followed by a read/write bit 1256 transmitted by setting SDA 1204 to logic high indicating a read is commanded from the location identified by the address 1254. In this example, the high-latency slave device is unable to provide the data within one clock cycle 1268 and responds with a negative acknowledgement (NACK 1258) by driving SDA 1204 high or by refraining from driving SDA 1204 such that SDA 1204 is pulled high in accordance with I3C protocols. In accordance with governing protocols, the master device retransmits the address 1260 followed by a read/write bit 1262 indicating a read command. The high-latency slave device retrieves the requested data after or while transmitting the NACK 1258. The high-latency slave device responds to the retransmitted address 1260 and read/write bit 1262 with an acknowledgement (ACK 1264) by driving SDA 1204 low. The high-latency slave device then transmits one or more data bytes 1266 on SDA 1204 in a mode consistent with I3C push-pull operation and commencing at the location identified by the address 1254, 1260. The clock signal transmitted on SCL 1202 may have an increased frequency according to I3C protocols.

The high-latency slave device may include a cache that holds one or more data bytes read from storage where each data byte is held in cache until transmission of the data byte is initiated. Complexity of the high-latency slave device may be increased when cache management logic or state machines are added.

According to certain aspects of this disclosure, high-latency slave devices can be accommodated on a multi-drop serial bus by selectively adding delays to clock timing. For example, delays may be added when a master device recognizes that a read transaction involves a high-latency slave device, while no delay is added when the master device recognizes that a read transaction involves a low-latency slave device.

Figure 13:
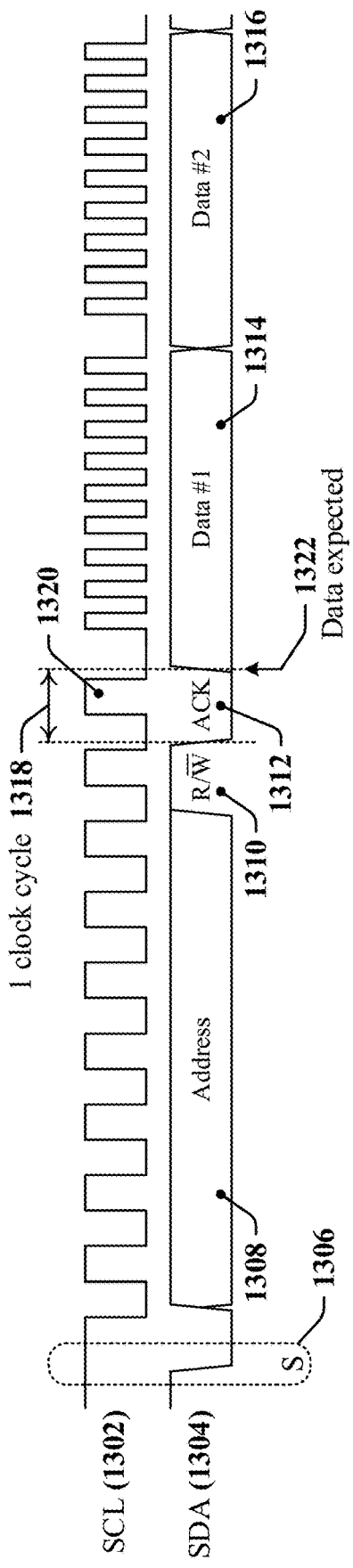
FIG. 13 illustrates the timing of read transactions on a multi-drop serial bus that is operated using an I3C protocol and adapted in accordance with certain aspects disclosed herein.
Figure 13:
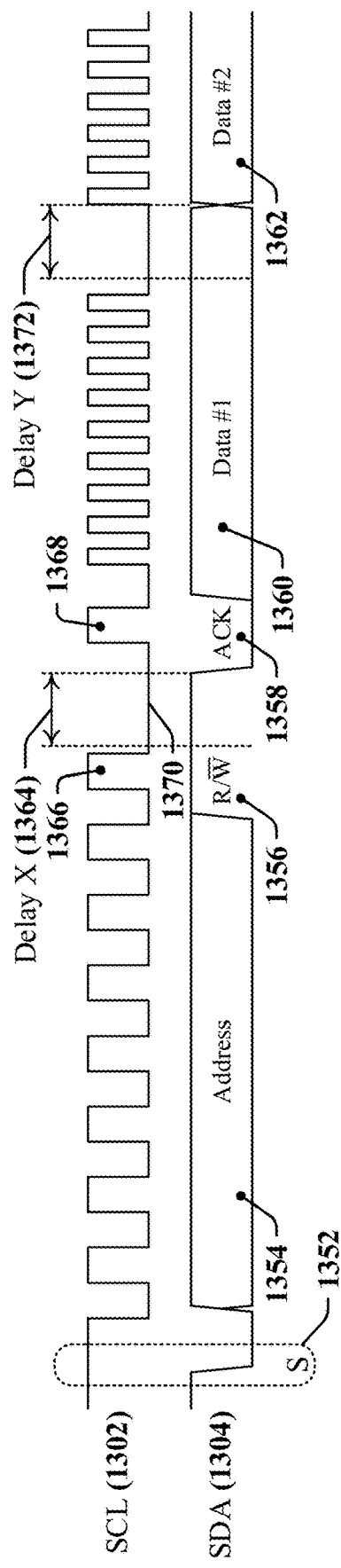

FIG. 13 includes timing diagrams 1300, 1350 that illustrate the timing of read transactions on a multi-drop serial bus that is operated using an I3C protocol adapted in accordance with certain aspects of this disclosure. A first timing diagram 1300 illustrates timing associated with a read transaction conducted between a master device and a low-latency slave device. The read transaction commences after signaling corresponding to a start condition 1306 is transmitted on SCL 1302 and SDA 1304. The master device transmits an address 1308 in a mode consistent with I2C open-drain operation, where the clock signal transmitted on SCL 1302 has a frequency that meets I2C limits and tolerances. The address 1308 is followed by a read/write bit 1310 transmitted by setting SDA 1304 to logic high indicating a read is commanded from the location identified by the address 1308. The low-latency slave device can provide the data within one clock cycle 1318 and responds with an acknowledgement (ACK 1312) by driving SDA 1304 low in accordance with the timing of a corresponding pulse 1320 transmitted on SCL 1302. Data is expected on SDA 1304 at a point in time 1322 after the falling edge of the pulse 1320 corresponding to the ACK 1312 provided by the slave device. The low-latency slave device then transmits one or more data bytes 1314, 1316 on SDA 1304 in a mode consistent with I3C push-pull operation and commencing at the location identified by the address 1308. The clock signal transmitted on SCL 1302 may have an increased frequency according to I3C protocols.

A second timing diagram 1350 illustrates timing associated with a read transaction conducted between a master device and a high-latency slave device when a delay is added in accordance with certain aspects of this disclosure. The read transaction commences after signaling corresponding to a start condition 1352 is transmitted on SCL 1302 and SDA 1304. The master device transmits an address 1354 in a mode consistent with I2C open-drain operation, where the clock signal transmitted on SCL 1302 has a frequency that meets I2C limits and tolerances. The address 1354 is followed by a read/write bit 1356 transmitted by setting SDA 1304 to logic high indicating a read is commanded from the location identified by the address 1354. In this example, the master device is aware that the high-latency slave device is unable to provide the data within one clock cycle and extends or delays the clock pulse 1368 associated with the ACK/NACK bit 1358. In the illustrated example, the master device prolongs the low period 1370 provided between a first clock pulse 1366 that is transmitted to provide timing for the read/write bit 1356 and a second clock pulse 1368 that is transmitted to provide timing for the ACK/NACK bit 1358. Prolonging the low period 1370 stalls the clock signal for the duration of a delay 1364 that may be defined in configuration information associated with the slave device.

The delay 1364 enables the high-latency slave device to retrieve data from the location identified by the address 1354 before the second clock pulse 1368 is terminated. The high-latency slave device responds with an acknowledgement as the ACK/NACK bit 1358 by driving SDA 1304 low while the second clock pulse 1368 is active. The high-latency slave device then transmits a first data byte 1360 on SDA 1304 in a mode consistent with I3C push-pull operation and commencing at the location identified by the address 1354. The clock signal transmitted on SCL 1302 may have an increased frequency according to I3C protocols.

The master device may subsequently extend or delay the clock signal between one or more pairs of data bytes 1360, 1362 to accommodate slow storage retrieval by the high-latency slave device. The subsequent delays 1372 may be have the same duration or a different duration as the delay 1364 provided after the read/write bit 1356 is transmitted. In some instances, no subsequent delay 1372 may be provided in the clock signal when the high-latency slave device includes a cache or buffer that enables the high-latency slave device to fetch a next data byte 1362 while a current data byte 1360 is being transmitted.

Figure 14:
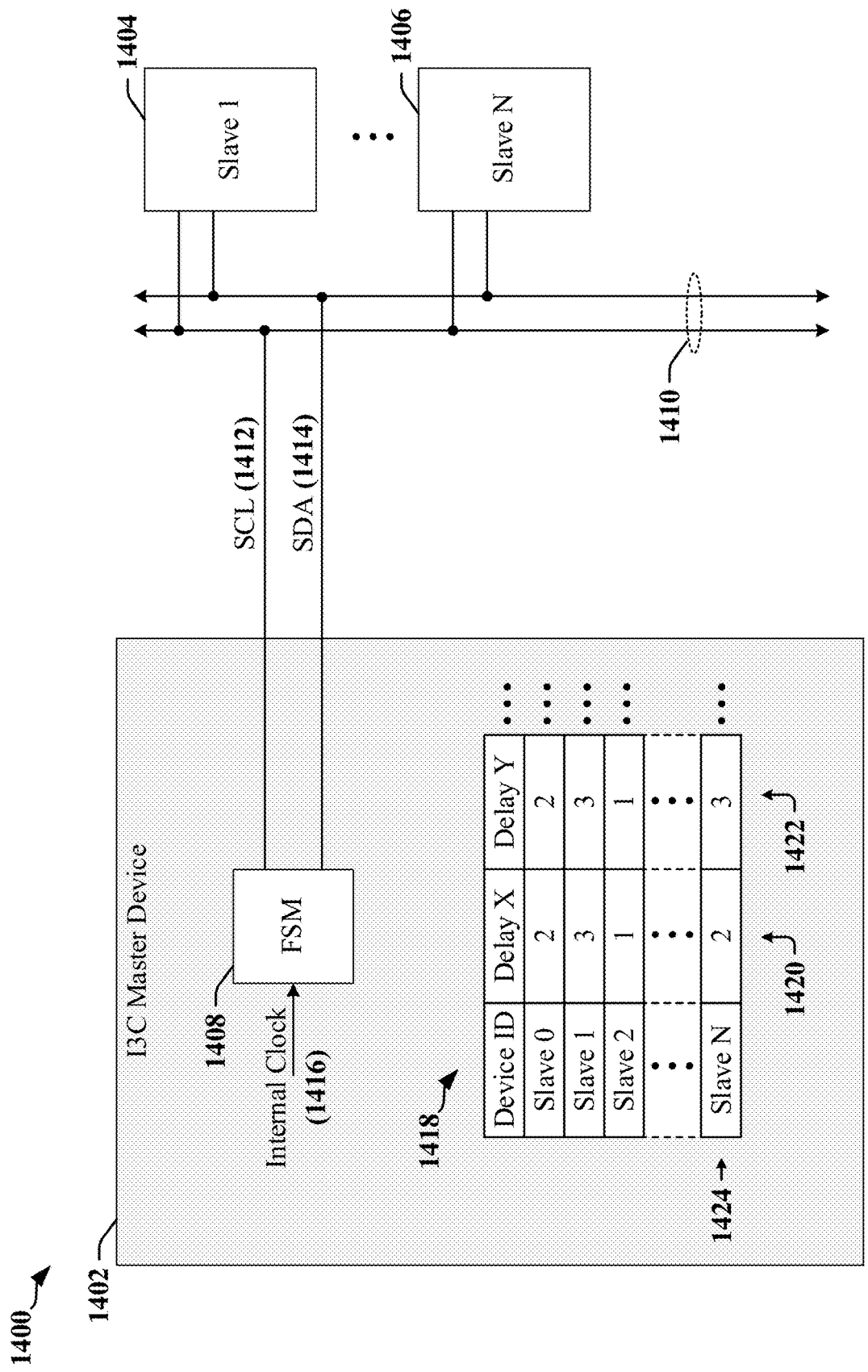
FIG. 14 illustrates a system configured to introduce delays in a clock signal transmitted in accordance with certain aspects disclosed herein.

FIG. 14 illustrates a system 1400 in which a master device 1402 can introduce delays in a clock signal transmitted on SCL 1412 of a multi-drop serial bus 1410 based on information maintained in a configuration table 1418. In certain implementations, the configuration table 1418 maintains delay values 1420, 1422 that may be paired and associated with enumerated slave devices 1404, 1406 coupled to the multi-drop serial bus 1410. Timing on the multi-drop serial bus 1410 may be managed by a finite state machine (FSM 1408), a processor and/or combinational logic. The configuration table 1418 may be populated or maintained by the master device 1402, or may be configured during system manufacture, assembly, configuration, and/or initialization. In one example, the master device 1402 populates the configuration table 1418 during enumeration, and/or upon identifying a type of slave device or capabilities reported by a slave device. The master device 1402 may provide the delays by stalling the clock signal transmitted on SCL 1412 in a low state for a duration of time identified in a configuration table 1418 populated or maintained by the master device.

In the illustrated system 1400, the master device 1402 and multiple (N) slave devices 1404, 1406 are coupled to SCL 1412 and SDA 1414 of the multi-drop serial bus 1410, which may be operated in accordance with I3C protocols. One or more delay values 1420, 1422 are provided for each of the slave devices 1404, 1406 in the configuration table 1418. In one example, a first set of delay values 1420 may be used to delay the clock pulse 1368 associated with the ACK/NACK bit 1358 in FIG. 13, while one or more additional delay values 1422 may be used to extend or delay the clock signal between one or more pairs of data bytes 1360, 1362. In another example, a first set of delay values 1420 may define a delay to be used when accessing addresses corresponding to a first type of storage, while a second set of delay values 1422 may define a delay to be used when accessing addresses corresponding to a second type of storage.

In one example, the delay values 1420, 1422 in the configuration table 1418 may represent a number of clock pulses of an internal clock signal 1416 used by the master device 1402. In another example, the delay values 1420, 1422 in the configuration table 1418 may represent a number of clock cycles of the clock signal transmitted on SCL 1412. In another example, the delay values 1420, 1422 in the configuration table 1418 may represent a number of half-clock cycles of the clock signal transmitted on SCL 1412. In another example, the delay values 1420, 1422 in the configuration table 1418 may be used to index or otherwise reference a counter or timer value used to control the delay in the clock signal transmitted on SCL 1412. In some instances, the delay values 1420, 1422 in the configuration table 1418 may binarily indicate whether a fixed-length delay is to be introduced in the clock signal transmitted on SCL 1412. In the latter instances, the delay values 1420, 1422 may indicate whether the corresponding slave devices are low-latency or high-latency devices, where high-latency devices are unable to provide data within the single clock cycle prescribed by protocol. In some instances, the delay values 1420, 1422 may be defined based on data size. In one example, a smaller delay value may be defined for a single data byte read than for a four data byte read.

In some implementations, delay values for read commands may be selected during an arbitration process. For example, a delay value may be configured based on the slave address of the slave that wins the arbitration process. In the illustrated example, a set of values 1424 is associated with the Nth slave device 1406.

Examples of Processing Circuits and Methods

Figure 15:
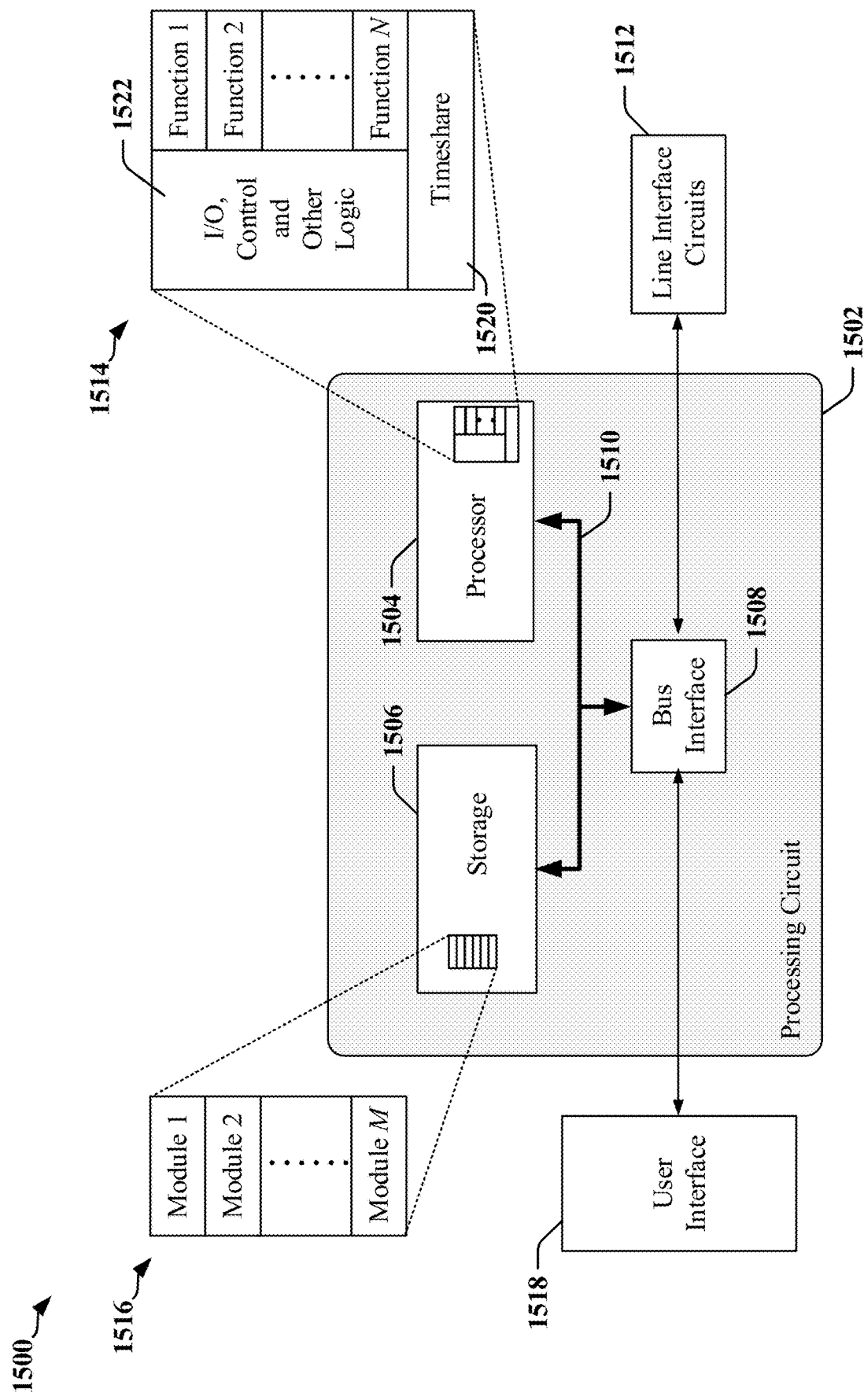
FIG. 15 is a block diagram illustrating an example of an apparatus employing a processing circuit that may be adapted according to certain aspects disclosed herein.

FIG. 15 is a diagram illustrating an example of a hardware implementation for an apparatus 1500 employing a processing circuit 1502 that may be configured to perform one or more functions disclosed herein. In accordance with various aspects of the disclosure, an element, or any portion of an element, or any combination of elements as disclosed herein may be implemented using the processing circuit 1502. The processing circuit 1502 may include one or more processors 1504 that are controlled by some combination of hardware and software modules. Examples of processors 1504 include microprocessors, microcontrollers, digital signal processors (DSPs), SoCs, ASICs, field programmable gate arrays (FPGAs), programmable logic devices (PLDs), state machines, sequencers, gated logic, discrete hardware circuits, and other suitable hardware configured to perform the various functionality described throughout this disclosure. The one or more processors 1504 may include specialized processors that perform specific functions, and that may be configured, augmented or controlled by one of the software modules 1516. The one or more processors 1504 may be configured through a combination of software modules 1516 loaded during initialization, and further configured by loading or unloading one or more software modules 1516 during operation. In various examples, the processing circuit 1502 may be implemented using a state machine, sequencer, signal processor and/or general-purpose processor, or a combination of such devices and circuits.

In the illustrated example, the processing circuit 1502 may be implemented with a bus architecture, represented generally by the bus 1510. The bus 1510 may include any number of interconnecting buses and bridges depending on the specific application of the processing circuit 1502 and the overall design constraints. The bus 1510 links together various circuits including the one or more processors 1504, and storage 1506. Storage 1506 may include memory devices and mass storage devices, and may be referred to herein as computer-readable media and/or processor-readable media. The bus 1510 may also link various other circuits such as timing sources, timers, peripherals, voltage regulators, and power management circuits. A bus interface 1508 may provide an interface between the bus 1510 and one or more transceivers 1512. A transceiver 1512 may be provided for each networking technology supported by the processing circuit. In some instances, multiple networking technologies may share some or all of the circuitry or processing modules found in a transceiver 1512. Each transceiver 1512 provides a means for communicating with various other apparatus over a transmission medium. Depending upon the nature of the apparatus 1500, a user interface 1518 (e.g., keypad, display, speaker, microphone, joystick) may also be provided, and may be communicatively coupled to the bus 1510 directly or through the bus interface 1508.

A processor 1504 may be responsible for managing the bus 1510 and for general processing that may include the execution of software stored in a computer-readable medium that may include the storage 1506. In this respect, the processing circuit 1502, including the processor 1504, may be used to implement any of the methods, functions and techniques disclosed herein. The storage 1506 may be used for storing data that is manipulated by the processor 1504 when executing software, and the software may be configured to implement any one of the methods disclosed herein.

One or more processors 1504 in the processing circuit 1502 may execute software. Software shall be construed broadly to mean instructions, instruction sets, code, code segments, program code, programs, subprograms, software modules, applications, software applications, software packages, routines, subroutines, objects, executables, threads of execution, procedures, functions, algorithms, etc., whether referred to as software, firmware, middleware, microcode, hardware description language, or otherwise. The software may reside in computer-readable form in the storage 1506 or in an external computer-readable medium. The external computer-readable medium and/or storage 1506 may include a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a "flash drive," a card, a stick, or a key drive), RAM, ROM, a programmable read-only memory (PROM), an erasable PROM (EPROM) including EEPROM, a register, a removable disk, and any other suitable medium for storing software and/or instructions that may be accessed and read by a computer. The computer-readable medium and/or storage 1506 may also include, by way of example, a carrier wave, a transmission line, and any other suitable medium for transmitting software and/or instructions that may be accessed and read by a computer. Computer-readable medium and/or the storage 1506 may reside in the processing circuit 1502, in the processor 1504, external to the processing circuit 1502, or be distributed across multiple entities including the processing circuit 1502. The computer-readable medium and/or storage 1506 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

The storage 1506 may maintain software maintained and/or organized in loadable code segments, modules, applications, programs, etc., which may be referred to herein as software modules 1516. Each of the software modules 1516 may include instructions and data that, when installed or loaded on the processing circuit 1502 and executed by the one or more processors 1504, contribute to a run-time image 1514 that controls the operation of the one or more processors 1504. When executed, certain instructions may cause the processing circuit 1502 to perform functions in accordance with certain methods, algorithms and processes described herein.

Some of the software modules 1516 may be loaded during initialization of the processing circuit 1502, and these software modules 1516 may configure the processing circuit 1502 to enable performance of the various functions disclosed herein. For example, some software modules 1516 may configure internal devices and/or logic circuits 1522 of the processor 1504, and may manage access to external devices such as the transceiver 1512, the bus interface 1508, the user interface 1518, timers, mathematical coprocessors, and so on. The software modules 1516 may include a control program and/or an operating system that interacts with interrupt handlers and device drivers, and that controls access to various resources provided by the processing circuit 1502. The resources may include memory, processing time, access to the transceiver 1512, the user interface 1518, and so on.

One or more processors 1504 of the processing circuit 1502 may be multifunctional, whereby some of the software modules 1516 are loaded and configured to perform different functions or different instances of the same function. The one or more processors 1504 may additionally be adapted to manage background tasks initiated in response to inputs from the user interface 1518, the transceiver 1512, and device drivers, for example. To support the performance of multiple functions, the one or more processors 1504 may be configured to provide a multitasking environment, whereby each of a plurality of functions is implemented as a set of tasks serviced by the one or more processors 1504 as needed or desired. In one example, the multitasking environment may be implemented using a timesharing program 1520 that passes control of a processor 1504 between different tasks, whereby each task returns control of the one or more processors 1504 to the timesharing program 1520 upon completion of any outstanding operations and/or in response to an input such as an interrupt. When a task has control of the one or more processors 1504, the processing circuit is effectively specialized for the purposes addressed by the function associated with the controlling task. The timesharing program 1520 may include an operating system, a main loop that transfers control on a round-robin basis, a function that allocates control of the one or more processors 1504 in accordance with a prioritization of the functions, and/or an interrupt driven main loop that responds to external events by providing control of the one or more processors 1504 to a handling function.

Figure 16:
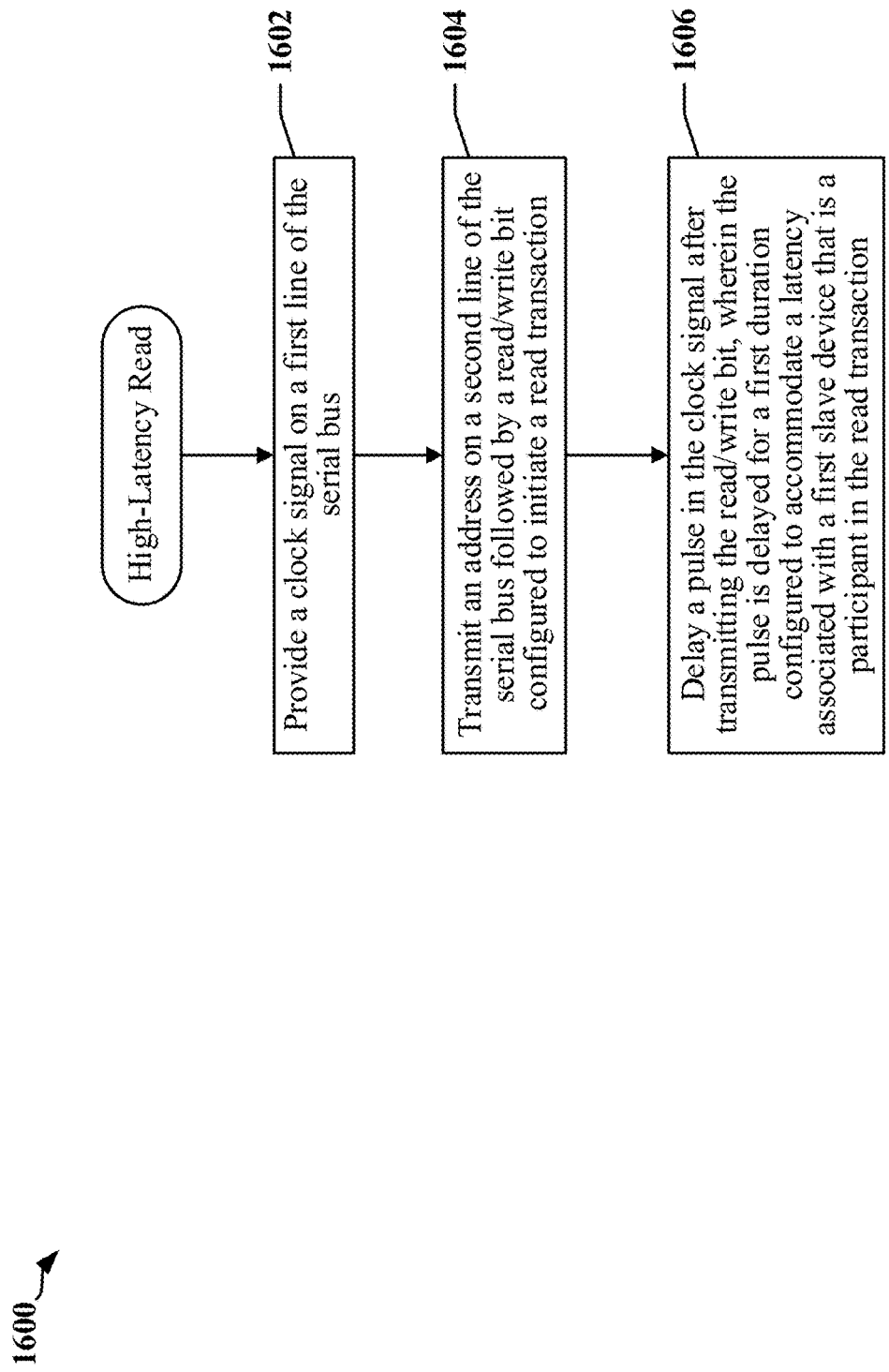
FIG. 16 is a second flowchart illustrating certain aspects of read commands from high-latency slave devices coupled to a serial bus in accordance with certain aspects disclosed herein.

FIG. 16 is a flowchart 1600 illustrating method for data communication that may be performed at a master device coupled to a serial bus. The serial bus may be operated in accordance with one or more I3C protocols. At block 1602, the master device may provide a clock signal on a first line of the serial bus. At block 1604, the master device may transmit an address on a second line of the serial bus followed by a read/write bit configured to initiate a read transaction. At block 1606, the master device may delay a pulse in the clock signal after transmitting the read/write bit. The pulse may be delayed for a first duration configured to accommodate a latency associated with a first slave device that is a participant in the read transaction.

In some examples, the master device may maintain configuration information for a plurality of slave devices, the configuration information identifying device latencies associated with each of the plurality of slave devices. The first duration may be configured based on a device latency of the first slave device identified in the configuration information. The master device may populate the configuration information while enumerating one or more of the plurality of slave devices. The device latencies may relate to different types of storage device. The configuration information may include device latencies reported by one or more of the plurality of slave devices.

In one example, the master device may configure the first duration after the first slave device wins a bus arbitration process. In one example, the master device may prolong a low-logic state in the clock signal after transmitting the read/write bit.

In certain examples, the master device may receive an acknowledgement from the first slave device while the pulse is being transmitted, and receive a first data byte from the first slave device after receiving the acknowledgment. The master device may stall the clock signal for a second duration after receiving the first data byte from the first slave device, and receive a second data byte from the first slave device after the acknowledgment. In some instances, the first duration and the second duration may be different in length. In other instances, the first duration and the second duration may be of the same length.

Figure 17:
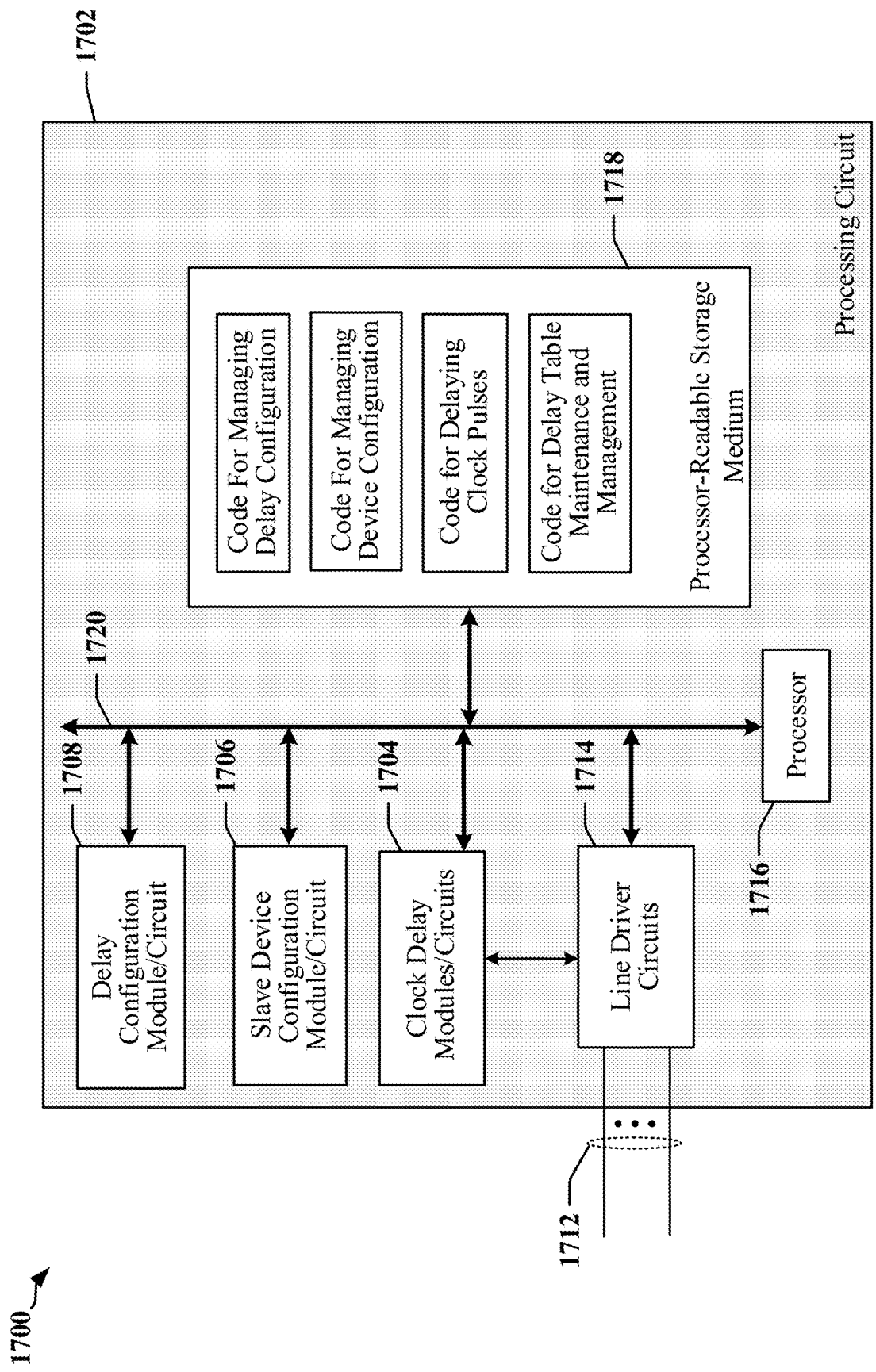
FIG. 17 illustrates a hardware implementation for an apparatus that supports efficient read transactions with high-latency slave devices coupled to a serial bus in accordance with certain aspects disclosed herein.

FIG. 17 is a diagram illustrating an example of a hardware implementation for an apparatus 1700 employing a processing circuit 1702. In one example, the apparatus 1700 is configured for data communication over a serial bus that is operated in accordance with one or more I3C protocols. The processing circuit typically has a controller or processor 1716 that may include one or more microprocessors, microcontrollers, digital signal processors, sequencers and/or state machines. The processing circuit 1702 may be implemented with a bus architecture, represented generally by the bus 1720. The bus 1720 may include any number of interconnecting buses and bridges depending on the specific application of the processing circuit 1702 and the overall design constraints. The bus 1720 links together various circuits including one or more processors and/or hardware modules, represented by the controller or processor 1716, the modules or circuits 1704, 1706 and 1708, and the processor-readable storage medium 1718. The apparatus may be coupled to a multi-wire communication link using a physical layer circuit 1714. The physical layer circuit 1714 may operate the multi-wire serial bus 1712 to support communications in accordance with I3C protocols. The bus 1720 may also link various other circuits such as timing sources, peripherals, voltage regulators, and power management circuits, which are well known in the art, and therefore, will not be described any further.

The processor 1716 is responsible for general processing, including the execution of software, code and/or instructions stored on the processor-readable storage medium 1718. The computer-readable storage medium may include a non-transitory storage medium. The software, when executed by the processor 1716, causes the processing circuit 1702 to perform the various functions described supra for any particular apparatus. The computer-readable storage medium may be used for storing data that is manipulated by the processor 1716 when executing software. The processing circuit 1702 further includes at least one of the modules 1704, 1706 and 1708. The modules 1704, 1706 and 1708 may be software modules running in the processor 1716, resident/stored in the processor-readable storage medium 1718, one or more hardware modules coupled to the processor 1716, or some combination thereof. The modules 1704, 1706 and 1708 may include microcontroller instructions, state machine configuration parameters, or some combination thereof.

In one configuration, the apparatus 1700 includes physical layer circuit 1714 that may include one or more line driver circuits including a first line driver coupled to a first wire of a multi-wire serial bus and a second line driver coupled to a second wire of the multi-wire serial bus 1712. In one example, the apparatus 1700 includes modules and/or circuits 1708 configured to arbitrate between devices contending for access to the serial bus, modules and/or circuits 1706 configured to manage clock signals and sampling signals, including configuring sampling delays. The apparatus 1700 may include modules and/or circuits 1704 configured to sample data signals using timing information provided by the modules and/or circuits 1706 configured to manage clock signals and sampling signals.

In one example, the apparatus 1700 includes a processor 1716 and a bus interface configured to couple the apparatus to a serial bus that has a first line configured to carry a clock signal and a second line configured to carry a data signal. The processor 1716 may be configured to provide the clock signal, transmit an address on the second line followed by a read/write bit configured to initiate a read transaction, and delay a pulse in the clock signal after transmitting the read/write bit. The pulse may be delayed for a first duration configured to accommodate a latency associated with a first slave device that is a participant in the read transaction.

The processor-readable storage medium 1718 may be configured to maintain configuration information for a plurality of slave devices. The configuration information may identify device latencies associated with each of the plurality of slave devices. The first duration may be configured based on a device latency of the first slave device identified in the configuration information. The processor 1716 may be further configured to populate the configuration information while enumerating one or more of the plurality of slave devices. The device latencies may relate to different types of storage device. The configuration information may include device latencies reported by one or more of the plurality of slave devices. The processor 1716 may be configured to configure the first duration after the first slave device wins a bus arbitration process.

The processor 1716 may be configured to prolong a low-logic state in the clock signal after transmitting the read/write bit. The processor 1716 may be configured to receive an acknowledgement from the first slave device while the pulse is being transmitted, and receive a first data byte from the first slave device after receiving the acknowledgment. The processor 1716 may be configured to stall the clock signal for a second duration after receiving the first data byte from the first slave device, and receive a second data byte from the first slave device after the acknowledgment. In some instances, the first duration and the second duration may be different in length. In other instances, the first duration and the second duration may be of the same length.

In another example, the processor-readable storage medium 1718 may store, maintain or otherwise include code which, when executed by the processor 1716, causes the processor 1716 to provide a clock signal on a first line of a serial bus, transmit an address on a second line of the serial bus followed by a read/write bit configured to initiate a read transaction, and delay a pulse in the clock signal after transmitting the read/write bit. The pulse is delayed for a first duration configured to accommodate a latency associated with a first slave device that is a participant in the read transaction.

The processor-readable storage medium 1718 may include code that causes the processor 1716 to maintain configuration information for a plurality of slave devices. The configuration information may identify device latencies associated with each of the plurality of slave devices. The first duration may be configured based on a device latency of the first slave device identified in the configuration information. The processor-readable storage medium 1718 may include code that causes the processor 1716 to populate the configuration information while enumerating one or more of the plurality of slave devices. The device latencies may relate to different types of storage device. The configuration information may include device latencies reported by one or more of the plurality of slave devices.

The processor-readable storage medium 1718 may include code that causes the processor 1716 to configure the first duration after the first slave device wins a bus arbitration process. The processor-readable storage medium 1718 may include code that causes the processor 1716 to prolong a low-logic state in the clock signal after transmitting the read/write bit. The processor-readable storage medium 1718 may include code that causes the processor 1716 to receive an acknowledgement from the first slave device while the pulse is being transmitted, and receive a first data byte from the first slave device after receiving the acknowledgment. The processor-readable storage medium 1718 may include code that causes the processor 1716 to stall the clock signal for a second duration after receiving the first data byte from the first slave device, and receive a second data byte from the first slave device after the acknowledgment. In some instances, the first duration and the second duration may be different in length. In other instances, the first duration and the second duration may be of the same length.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method for data communication comprising:
   providing a clock signal on a first line of a serial bus;
   transmitting an address on a second line of the serial bus followed by a read/write bit configured to initiate a read transaction; and
   delaying a pulse in the clock signal after transmitting the read/write bit, wherein the pulse is delayed for a first duration configured to accommodate a latency associated with a first slave device that is a participant in the read transaction.

2. The method of claim 1, further comprising:
   maintaining configuration information for a plurality of slave devices, the configuration information identifying device latencies associated with each of the plurality of slave devices,
   wherein the first duration is configured based on a device latency of the first slave device identified in the configuration information.

3. The method of claim 2, further comprising:
   populating the configuration information while enumerating one or more of the plurality of slave devices.

4. The method of claim 2, wherein the device latencies relate to different types of storage device.

5. The method of claim 2, wherein the configuration information includes device latencies reported by one or more of the plurality of slave devices.

6. The method of claim 1, further comprising:
   configuring the first duration after the first slave device wins a bus arbitration process.

7. The method of claim 1, wherein delaying the pulse comprises:
   prolonging a low-logic state in the clock signal after transmitting the read/write bit.

8. The method of claim 1, further comprising:
   receiving an acknowledgement from the first slave device while the pulse is being transmitted; and
   receiving a first data byte from the first slave device after receiving the acknowledgment.

9. The method of claim 8, further comprising:
   stalling the clock signal for a second duration after receiving the first data byte from the first slave device; and
   receiving a second data byte from the first slave device after receiving the acknowledgment.

10. The method of claim 9, wherein the first duration and the second duration are different in length.

11. The method of claim 1, wherein the serial bus is operated in accordance with an Improved Inter-Integrated Circuit (I3C) protocol.

12. An apparatus for data communication, comprising:
    a bus interface configured to couple the apparatus to a serial bus that has a first line configured to carry a clock signal and a second line configured to carry a data signal; and
    a processor configured to:
      provide the clock signal;
      transmit an address on the second line of the serial bus followed by a read/write bit configured to initiate a read transaction; and
      delay a pulse in the clock signal after transmitting the read/write bit,
      wherein the pulse is delayed for a first duration configured to accommodate a latency associated with a first slave device that is a participant in the read transaction.

13. The apparatus of claim 12, further comprising a storage device configured to maintain configuration information for a plurality of slave devices, the configuration information identifying device latencies associated with each of the plurality of slave devices, wherein the first duration is configured based on a device latency of the first slave device identified in the configuration information.

14. The apparatus of claim 13, wherein the processor is further configured to:
    populate the configuration information while enumerating one or more of the plurality of slave devices, wherein the device latencies relate to different types of storage device.

15. The apparatus of claim 13, wherein the configuration information includes device latencies reported by one or more of the plurality of slave devices.

16. The apparatus of claim 12, wherein the processor is further configured to:
    configure the first duration after the first slave device wins a bus arbitration process.

17. The apparatus of claim 12, wherein the processor is further configured to:
    prolong a low-logic state in the clock signal after transmitting the read/write bit.

18. The apparatus of claim 12, wherein the processor is further configured to:
    receive an acknowledgement from the first slave device while the pulse is being transmitted; and
    receive a first data byte from the first slave device after receiving the acknowledgment.

19. The apparatus of claim 18, wherein the processor is further configured to:
    stall the clock signal for a second duration after receiving the first data byte from the first slave device; and
    receive a second data byte from the first slave device after receiving the acknowledgment.

20. The apparatus of claim 19, wherein the first duration and the second duration are different in length.

21. A processor-readable storage medium including code which, when executed by a processor, causes the processor to:
    provide a clock signal on a first line of a serial bus;
    transmit an address on a second line of the serial bus followed by a read/write bit configured to initiate a read transaction; and
    delay a pulse in the clock signal after transmitting the read/write bit, wherein the pulse is delayed for a first duration configured to accommodate a latency associated with a first slave device that is a participant in the read transaction.

22. The storage medium of claim 21, further comprising code that causes the processor to:
    maintain configuration information for a plurality of slave devices, the configuration information identifying device latencies associated with each of the plurality of slave devices,
    wherein the first duration is configured based on a device latency of the first slave device identified in the configuration information.

23. The storage medium of claim 22, further comprising code that causes the processor to:
    populate the configuration information while enumerating one or more of the plurality of slave devices.

24. The storage medium of claim 22, wherein the device latencies relate to different types of storage device.

25. The storage medium of claim 22, wherein the configuration information includes device latencies reported by one or more of the plurality of slave devices.

26. The storage medium of claim 21, further comprising code that causes the processor to:
   configure the first duration after the first slave device wins a bus arbitration process.

27. The storage medium of claim 21, further comprising code that causes the processor to:
   prolong a low-logic state in the clock signal after transmitting the read/write bit.

28. The storage medium of claim 21, further comprising code that causes the processor to:
   receive an acknowledgement from the first slave device while the pulse is being transmitted; and
   receive a first data byte from the first slave device after receiving the acknowledgment.

29. The storage medium of claim 28, further comprising code that causes the processor to:
   stall the clock signal for a second duration after receiving the first data byte from the first slave device; and
   receive a second data byte from the first slave device after receiving the acknowledgment.

30. The storage medium of claim 29, wherein the first duration and the second duration are different in length.

* * * * *